(12) United States Patent
Mondal

(10) Patent No.: US 12,302,110 B2
(45) Date of Patent: May 13, 2025

(54) METHOD AND SYSTEM FOR PHYSICAL LAYER SUB-CELL IDENTITY ALLOCATION IN A WIRELESS NETWORK

(71) Applicant: Telefonaktiebolaget LM Ericsson (publ), Stockholm (SE)

(72) Inventor: Surajit Mondal, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 432 days.

(21) Appl. No.: 17/631,308

(22) PCT Filed: Aug. 7, 2019

(86) PCT No.: PCT/IN2019/050576
§ 371 (c)(1),
(2) Date: Jan. 28, 2022

(87) PCT Pub. No.: WO2021/024268
PCT Pub. Date: Feb. 11, 2021

(65) Prior Publication Data
US 2022/0264311 A1    Aug. 18, 2022

(51) Int. Cl.
*H04W 16/10*    (2009.01)
*H04W 24/02*    (2009.01)
(Continued)

(52) U.S. Cl.
CPC ........... *H04W 16/10* (2013.01); *H04W 24/02* (2013.01); *H04W 24/10* (2013.01); *H04W 40/24* (2013.01)

(58) Field of Classification Search
CPC ..... H04W 16/10; H04W 24/02; H04W 24/10; H04W 40/24; H04W 16/18
See application file for complete search history.

(56) References Cited

U.S. PATENT DOCUMENTS 9,578,592 B2 *  2/2017  Bhardwaj ............ H04J 11/0069
9,894,659 B1    2/2018  Wang et al.
(Continued)

FOREIGN PATENT DOCUMENTS

CN    101784055 A    7/2010
CN    104956705 A    9/2015
(Continued)

OTHER PUBLICATIONS

International Search Report and Written Opinion of the International Searching Authority for PCT International Application No. PCT/IN2019/050576 dated Nov. 15, 2019.
(Continued)

*Primary Examiner* — Mounir Moutaouakil
(74) *Attorney, Agent, or Firm* — Sage Patent Group

(57) ABSTRACT

Embodiments of the invention include methods, system, and software for physical layer sub-cell identity allocation to select a sub-cell identity vector for a network device in a wireless network. In one embodiment, a method includes selecting a plurality of sub-cell identity vector candidates for the network device from a set of possible sub-cell identity vector candidates, where the selecting removes one or more possible sub-cell identity vector candidates containing a same sub-cell identity for two or more adjacent sectors of the network device. The method further includes determining a plurality of conflict measurements for each of the plurality of sub-cell identity vector candidates. The method continues with deriving a single value from the plurality of conflict measurements for each of the plurality of sub-cell identity vector candidates and selecting the sub-cell identity vector for the network device from the plurality of sub-cell identity vector candidates based on the single value.

20 Claims, 22 Drawing Sheets

LTE PCI

5G NR PCI

(51) Int. Cl.
*H04W 24/10* (2009.01)
*H04W 40/24* (2009.01)

(56) References Cited

U.S. PATENT DOCUMENTS

| | | | |
|---|---|---|---|
| 10,075,842 B2 * | 9/2018 | Zhou | H04W 24/10 |
| 10,264,475 B2 * | 4/2019 | Yi | H04W 72/0473 |
| 10,491,352 B1 * | 11/2019 | Tailor | H04L 5/0048 |
| 10,505,687 B1 * | 12/2019 | Tailor | H04W 36/0083 |
| 10,652,843 B2 * | 5/2020 | Qu | H04J 11/00 |
| 10,736,023 B2 * | 8/2020 | Sun | H04W 24/02 |
| 2015/0319611 A1 * | 11/2015 | Garcia | H04W 16/18 370/329 |
| 2018/0205480 A1 * | 7/2018 | Akkarakaran | H04L 5/0073 |
| 2018/0270671 A1 | 9/2018 | Agnihotri et al. | |

FOREIGN PATENT DOCUMENTS

| | | |
|---|---|---|
| CN | 104956709 A | 9/2015 |
| CN | 105940702 A | 9/2016 |
| CN | 105933933 B | 5/2019 |
| EP | 2929713 A1 | 10/2015 |
| WO | 2013082926 A1 | 6/2013 |
| WO | 2014086397 A1 | 6/2014 |

OTHER PUBLICATIONS

Extended European Search Report mailed Jul. 8, 2022 for European Patent Application No. 19940318.9, 11 pages.
Motorola Mobility et al.; "Discussion on NR-SSS Working Assumption"; 3GPP TSG RAN WG1 NR Ad-Hoc #2; R1-1711275; Qingdao, P.R. China; Jun. 27-30, 2017; 5 pages.
Chinese Office Action and English Translation, Chinese Patent Application No. 201980098987.6, mailed Jan. 26, 2025, 18 pages.

* cited by examiner

Sub-cell-ID Permutations with PCI-
Group Optimization 804

[0,2,0,1],
[0,1,1,2],
[1,2,2,0],
[0,2,2,1],
[1,2,0,0],
[2,0,1,0],
[1,2,1,0],
[1,0,0,2],
[0,1,2,2],
[2,1,0,1],
[1,0,1,2],
[0,0,1,2],
[0,2,1,0],
[1,0,2,2],
[2,2,0,1],
[1,2,0,1],
[2,0,1,1],
[1,1,0,2],
[1,2,0,2],
[0,0,2,1],
[2,1,0,2],
[0,1,2,0],
[0,2,1,1],
[1,0,2,0],
[2,2,1,0],
[2,0,1,2],
[2,0,0,1],
[0,1,2,1],
[2,1,0,0],
[1,1,2,0],
[2,1,1,0],
[0,2,1,2],
[1,0,2,1],
[2,0,2,1],
[2,1,2,0],
[0,1,0,2],

— Exemplary Sector
Adjacency Conflicts 852

All Sub-cell-ID
Permutations
802

Sub-cell-ID Permutations with
Sector Adjacency Conflicts
Removed 806

Conflict Measurement Table 1522

| Subcellid_Subcellid_Plan_ID_n | Conflict_count | Distance_Meter_mean | Relative_Orientation_mean | Face_Factor_mean | Building_Area_sqrm_sum | Route_Length_meter_sum |
|---|---|---|---|---|---|---|
| 1502 | 1506 | 1508 | 1510 | 1512 | 1514 | 1516 |
| 0 | [0, 2, 0, 1] | 15 | 678 | 11 | 67.333 | 1859.519 | 503.786 |
| 1 | [0, 1, 2, 1] | 13 | 728 | 11 | 50.769 | 2821.165 | 0.000 |
| 2 | [1, 0, 2, 0] | 12 | 712 | 12 | 107.083 | 436697.942 | 10040.871 |
| 3 | [2, 0, 1, 0] | 12 | 712 | 12 | 79.583 | 15214.583 | 5399.738 |
| 4 | [1, 2, 1, 0] | 11 | 715 | 12 | 123.636 | 436696.237 | 10311.657 |
| 5 | [0, 2, 1, 2] | 12 | 732 | 10 | 69.167 | 1246.292 | 503.786 |
| 6 | [2, 0, 2, 1] | 12 | 712 | 12 | 61.250 | 153639.481 | 5325.877 |
| 7 | [2, 1, 0, 1] | 15 | 662 | 12 | 69.333 | 158312.661 | 5092.877 |
| 8 | [2, 1, 2, 0] | 12 | 712 | 12 | 65.833 | 157862.445 | 5166.738 |
| 9 | [1, 0, 1, 2] | 12 | 712 | 12 | 112.917 | 436696.991 | 9967.010 |
| 10 | [0, 1, 0, 2] | 16 | 678 | 11 | 66.250 | 4763.177 | 0.000 |
| 11 | [1, 2, 0, 2] | 14 | 660 | 12 | 110.000 | 436223.146 | 10237.736 |

FIG. 15

Normalized Conflict Measurement Table 1622

| SubcellId_Plan_ID | SubcellId | score_Co nflict_co unt | score_Dist ance_Mete r_mean | score_Relativ e_Orientation _mean | score_Face_F actor_mean | score_Building _Area_sqrm _mean | score_Route_L ength_meter |
|---|---|---|---|---|---|---|---|
| 0 | [0, 2, 0, 1] | 0.800 | 0.755 | 0.556 | 0.227 | 0.001 | 0.049 |
| 1 | [0, 1, 2, 1] | 0.400 | 0.053 | 0.868 | 0.000 | 0.004 | 0.000 |
| 2 | [1, 0, 2, 0] | 0.200 | 0.281 | 0.305 | 0.773 | 0.987 | 0.974 |
| 3 | [2, 0, 1, 0] | 0.200 | 0.281 | 0.305 | 0.395 | 0.353 | 0.524 |
| 4 | [1, 2, 1, 0] | 0.000 | 0.244 | 0.397 | 1.000 | 1.000 | 1.000 |
| 5 | [0, 2, 1, 2] | 1.000 | 0.000 | 1.000 | 0.252 | 0.000 | 0.049 |
| 6 | [2, 0, 2, 1] | 0.200 | 0.281 | 0.305 | 0.144 | 0.347 | 0.516 |
| 7 | [2, 1, 0, 1] | 0.800 | 0.879 | 0.000 | 0.255 | 0.358 | 0.494 |
| 8 | [2, 1, 2, 0] | 0.200 | 0.281 | 0.305 | 0.207 | 0.357 | 0.501 |
| 9 | [1, 0, 1, 2] | 0.200 | 0.281 | 0.477 | 0.853 | 0.997 | 0.967 |
| 10 | [0, 1, 0, 2] | 1.000 | 0.751 | 0.051 | 0.212 | 0.008 | 0.000 |
| 11 | [1, 2, 0, 2] | 0.600 | 1.000 | 0.051 | 0.813 | 0.989 | 0.993 |

FIG. 16

| Subcellid_Pl an_ID 1502 | Subcellid _Plan 1504 | score_C ount 1606 | score_Distance_Meteve_r_mean 1608 | score_Relati cance_Meteve_n_mean 1610 | score_Face_Orientatio Factor_mean 1612 | score_Face_Area_sqrm 1614 | score_Buildinscore_Route_Length_meter 1616 | score 1702 |
|---|---|---|---|---|---|---|---|---|
| 0 | [0, 2, 0, 1] | 0.800 | 0.755 | 0.556 | 0.227 | 0.001 | 0.049 | 2.388 |
| 1 | [0, 1, 2, 1] | 0.400 | 0.053 | 0.868 | 0.000 | 0.004 | 0.000 | 1.325 |
| 2 | [1, 0, 2, 0] | 0.200 | 0.281 | 0.305 | 0.773 | 0.997 | 0.974 | 3.530 |
| 3 | [2, 0, 1, 0] | 0.200 | 0.281 | 0.305 | 0.395 | 0.353 | 0.524 | 2.058 |
| 4 | [1, 2, 1, 0] | 0.000 | 0.244 | 0.397 | 1.000 | 1.000 | 1.000 | 3.641 |
| 5 | [0, 2, 1, 2] | 0.200 | 0.000 | 1.000 | 0.252 | 0.000 | 0.049 | 1.501 |
| 6 | [2, 0, 2, 1] | 0.200 | 0.281 | 0.305 | 0.144 | 0.347 | 0.516 | 1.794 |
| 7 | [2, 1, 0, 1] | 0.200 | 0.281 | 0.305 | 0.255 | 0.358 | 0.494 | 2.886 |
| 8 | [2, 1, 2, 0] | 0.200 | 0.281 | 0.305 | 0.207 | 0.357 | 0.501 | 1.851 |
| 9 | [1, 0, 1, 2] | 0.800 | 0.751 | 0.477 | 0.853 | 0.997 | 0.967 | 3.602 |
| 10 | [0, 1, 0, 2] | 1.000 | 1.000 | 0.051 | 0.212 | 0.008 | 0.000 | 2.448 |
| 11 | [1, 2, 0, 2] | 0.600 | 0.751 | 0.051 | 0.813 | 0.999 | 0.993 | 4.465 |

Normalized Conflict Measurement Table with Calculated Sub-cell-ID Conflict Values 1722

The permutation with the lowest value maps to the one with least PSS interference. 1750

FIG. 17

Determine a plurality of conflict measurements (including one or more of 1902-1914 below) for each of the plurality of sub-cell identity vector candidates, each conflict measurement for a metric measuring sub-cell identity confliction of the plurality of sectors with one or more neighbor cells of the network device in the wireless network, each of the one or more neighbor cells belonging to another network device. 1806

| A number of conflicts of the plurality of sectors with the one or more neighbor cells. 1902 | A distance measurement of the number of conflicts. 1904 | A relative orientation measurement of the number of conflicts. 1906 | A face factor measurement for face factor between the plurality of sectors and the one or more neighbor cell. 1908 | A size measurement of one or more overlap regions between the plurality of sectors and the one or more. 1910 | A route length measurement for rout length in the one or more overlap regions between the plurality of sectors and the one or more neighbor cells. 1912 | A size measurement for building areas in the one or more overlap regions between the plurality of sectors and the one or more neighbor cells. 1914 |

FIG. 19

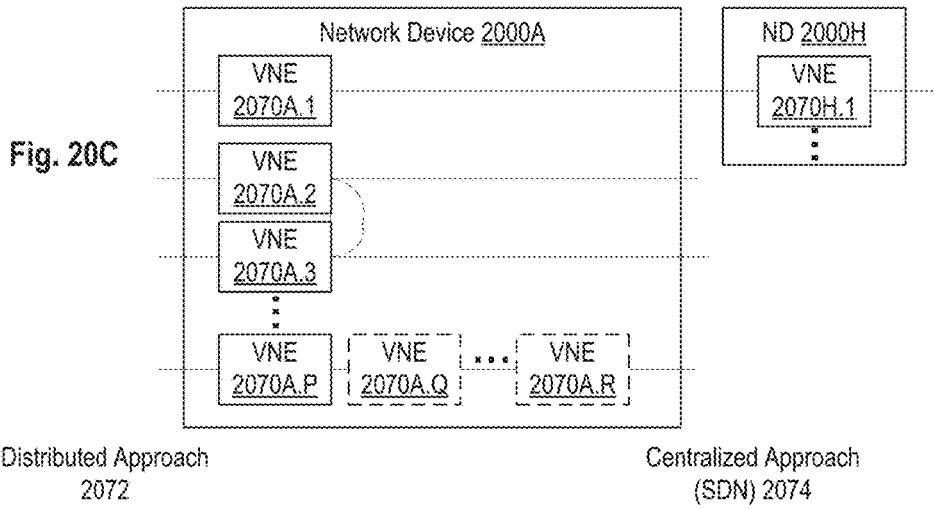
Fig. 20C
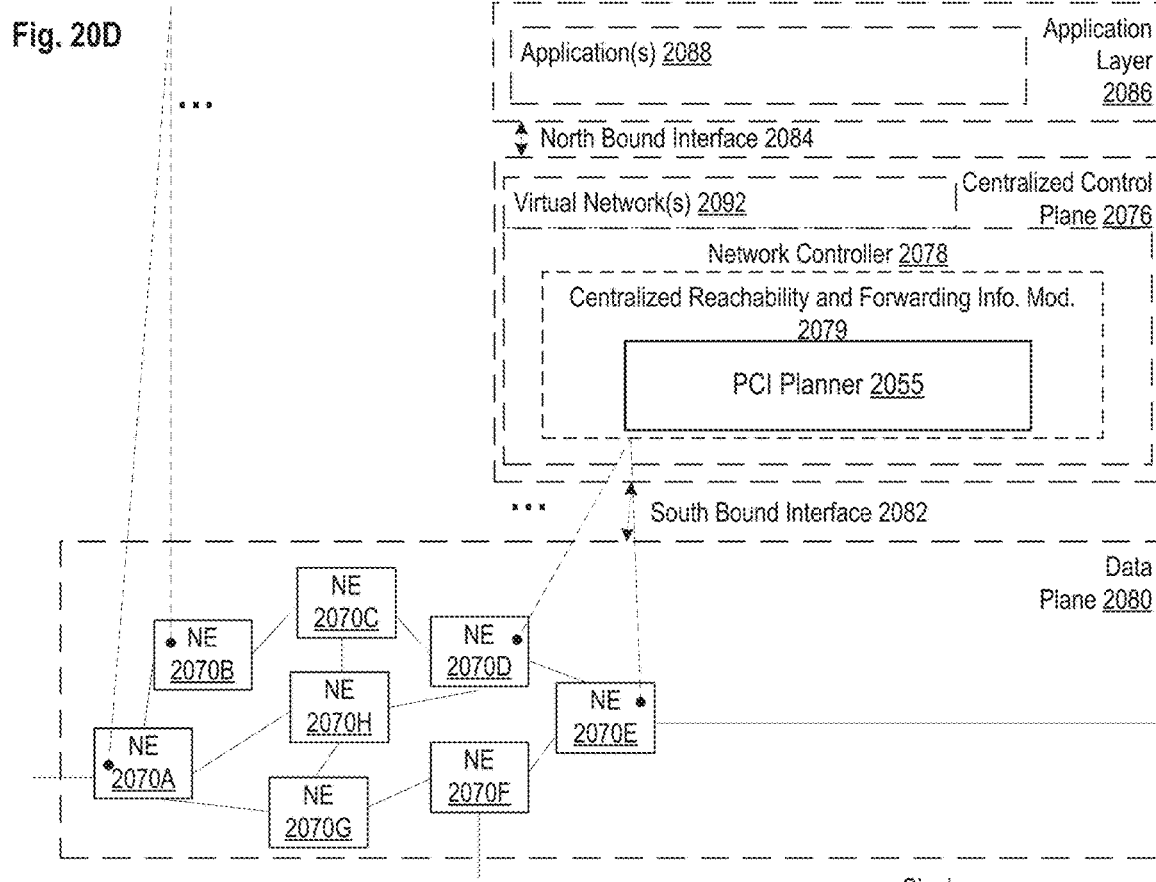
Fig. 20D
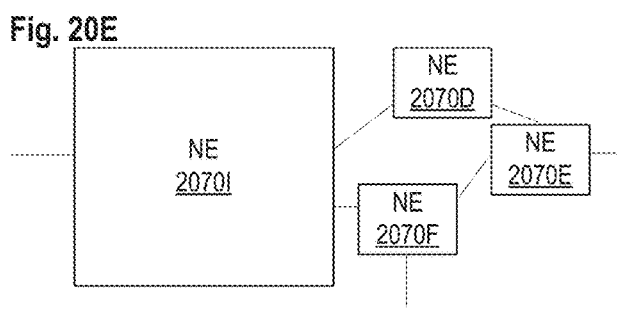
Fig. 20E
Fig. 20F

METHOD AND SYSTEM FOR PHYSICAL LAYER SUB-CELL IDENTITY ALLOCATION IN A WIRELESS NETWORK

CROSS REFERENCE TO RELATED APPLICATION

This application is a 35 U.S.C. § 371 national stage application of PCT International Application No. PCT/IN2019/050576 filed on Aug. 7, 2019, the disclosure and content of which is incorporated by reference herein in its entirety.

TECHNICAL FIELD

Embodiments of the invention relate to the field of networking; and more specifically, to allocate physical layer sub-cell identity in a wireless network.

BACKGROUND ART

Wireless network standards such as Long-Term Evolution (LTE) and the fifth-generation cellular network technology new radio (5G NR) define two downlink synchronization signals—Primary synchronization signal (PSS) and Secondary synchronization signal (SSS). PSS and SSS are used to achieve subframe, slot, and symbol synchronization in the time domain. For cell search, detecting PSS and SSS is a prerequisite to measuring the Cell-specific Reference Signals (CRS) and decoding the Master Information Block (MIB) on the Physical Broadcast Channel (PBCH), and cell synchronization is the very first step during cell search procedure (e.g., initial terminal device camp on, terminal device handover between base stations) in some wireless networks.

A physical cell identity (PCI) is an identifier of a cell in the physical layer of a wireless network, and it may be used for separation of different transmitters. The PCI can be expressed as a combination of a physical layer cell identity group (referred to as PCI-group, often denoted using physicalLayerCellIdGroup) and physical layer sub-cell identity (referred to interchangeably as PCI-ID, PCI-Sub-cell-ID, Sub-cell-ID, or Subcell ID, and often denoted using physicalLayerSubCellId). The PSS may be used to identify the center of the channel bandwidth in the frequency domain and deduce a pointer towards one of three physical layer sub-cell identities, while the SSS may be used to identify the PCI-group number.

PCI planning (also referred to as PCI allocation, selection, or management) is to assign PCIs to cells and sectors of cells. Existing approaches focus on identifying a suitable PCI or PCI-group to yield a maximum PCI reuse distance. Yet when two or more adjacent/neighbor cells/sectors use the same Sub-cell-ID, the reference signals aligned based on the PSS cause conflicts among the adjacent/neighbor cells/sectors and degrade cell search performance.

SUMMARY

Embodiments of the disclosed techniques include methods for physical layer sub-cell identity allocation to select a sub-cell identity vector for a network device in a wireless network. In one embodiment, a method includes selecting a plurality of sub-cell identity vector candidates for the network device from a set of possible sub-cell identity vector candidates, where the network device has a plurality of sectors, each of which is to be allocated to one sub-cell identity within the sub-cell identity vector, and where the selecting removes one or more possible sub-cell identity vector candidates containing a same sub-cell identity for two or more adjacent sectors of the network device. The method further includes determining a plurality of conflict measurements for each of the plurality of sub-cell identity vector candidates, each conflict measurement for a metric measuring sub-cell identity conflict of the plurality of sectors with one or more neighbor cells of the network device in the wireless network, each of the one or more neighbor cells belonging to another network device. The method continues with deriving a single value from the plurality of conflict measurements for each of the plurality of sub-cell identity vector candidates and selecting the sub-cell identity vector for the network device from the plurality of sub-cell identity vector candidates based on the single value.

Embodiments of the disclosed techniques include electronic devices for physical layer sub-cell identity allocation to select a sub-cell identity vector for a network device in a wireless network. In one embodiment, an electronic device comprises a processor and non-transitory computer-readable storage medium that provides instructions that, when executed by the processor, cause the electronic device to perform one or more methods for physical layer sub-cell identity allocation to select a sub-cell identity vector for a network device in a wireless network. One method includes selecting a plurality of sub-cell identity vector candidates for the network device from a set of possible sub-cell identity vector candidates, where the network device has a plurality of sectors, each of which is to be allocated to one sub-cell identity within the sub-cell identity vector, and where the selecting removes one or more possible sub-cell identity vector candidates containing a same sub-cell identity for two or more adjacent sectors of the network device. The method further includes determining a plurality of conflict measurements for each of the plurality of sub-cell identity vector candidates, each conflict measurement for a metric measuring sub-cell identity conflict of the plurality of sectors with one or more neighbor cells of the network device in the wireless network, each of the one or more neighbor cells belonging to another network device. The method continues with deriving a single value from the plurality of conflict measurements for each of the plurality of sub-cell identity vector candidates and selecting a sub-cell identity vector for the network device from the plurality of sub-cell identity vector candidates based on the single value.

Embodiments of the disclosed techniques include non-transitory computer-readable storage media for physical layer sub-cell identity allocation to select a sub-cell identity vector for a network device in a wireless network. In one embodiment, a non-transitory computer-readable storage medium provides instructions that, when executed, cause an electronic device to perform one or more methods for physical layer sub-cell identity allocation to select a sub-cell identity vector for a network device in a wireless network. One method includes selecting a plurality of sub-cell identity vector candidates for the network device from a set of possible sub-cell identity vector candidates, where the network device has a plurality of sectors, each of which is to be allocated to one sub-cell identity within the sub-cell identity vector, and where the selecting removes one or more possible sub-cell identity vector candidates containing a same sub-cell identity for two or more adjacent sectors of the network device. The method further includes determining a plurality of conflict measurements for each of the plurality of sub-cell identity vector candidates, each conflict measurement for a metric measuring sub-cell identity conflict of the plurality of sectors with one or more neighbor cells of the network device in the wireless network, each of the one or more neighbor cells belonging to another network device. The method continues with deriving a single value from the plurality of conflict measurements for each of the plurality of sub-cell identity vector candidates and selecting a sub-cell identity vector for the network device from the plurality of sub-cell identity vector candidates based on the single value.

Embodiments of the disclosed techniques provide ways for an electronic device to provide an optimal physical layer sub-cell identity allocation so that the performance of cell search procedure is improved.

BRIEF DESCRIPTION OF THE DRAWINGS

The invention may best be understood by referring to the following description and accompanying drawings that are used to illustrate embodiments of the invention. In the drawings:

FIG. 8 shows removal of sector adjacency conflicts per some embodiments of the invention.

FIG. 15 shows a table that includes a number of measurements for a set of Sub-cell-ID permutations per some embodiments of the invention.

FIG. 16 shows a table that includes normalized measurements for a set of Sub-cell-ID permutations per some embodiments of the invention.

FIG. 17 shows a table that includes normalized measurements with calculated Sub-cell-ID conflict values for a set of Sub-cell-ID permutations per some embodiments of the invention.

FIG. 19 is a flow diagram illustrating the selection of metrics for measuring sub-cell identity confliction according to some embodiments of the invention.

FIG. 20C illustrates various exemplary ways in which virtual network elements (VNEs) may be coupled according to some embodiments of the invention.

FIG. 20D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 20E illustrates the simple case of where each of the NDs implements a single NE, but a centralized control plane has abstracted multiple of the NEs in different NDs into (to represent) a single NE in one of the virtual network(s), according to some embodiments of the invention.

FIG. 20F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 1:
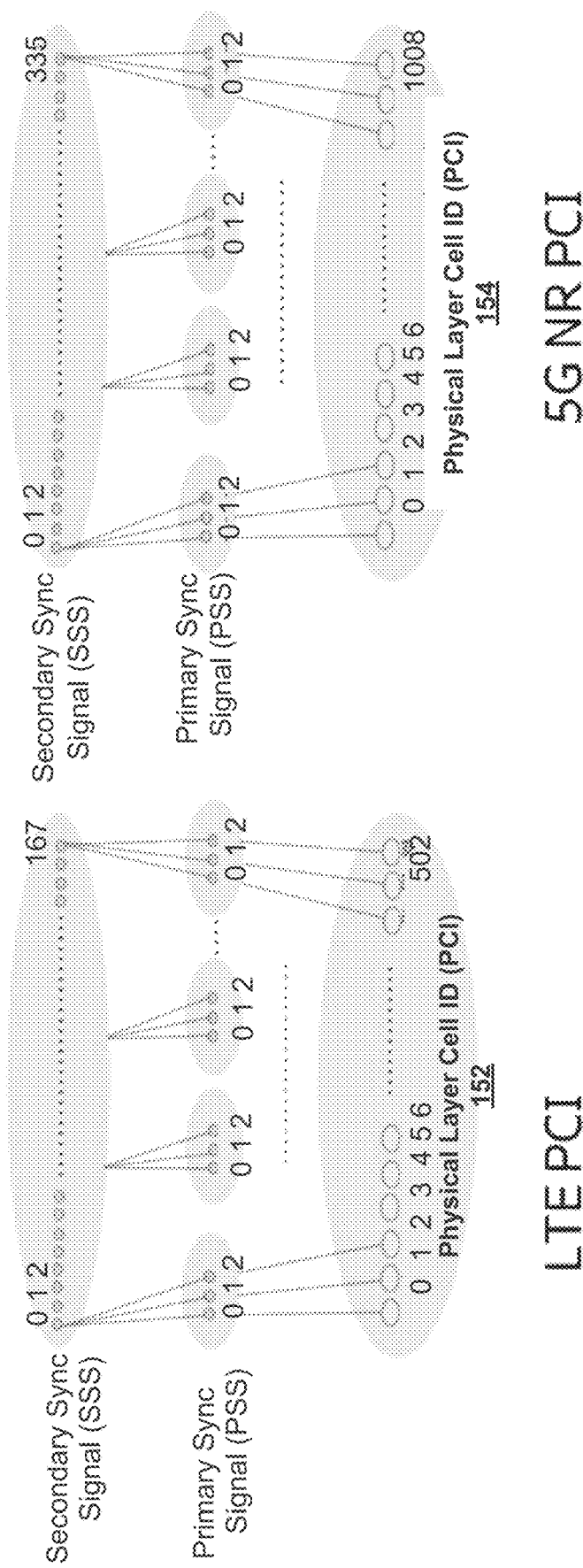
FIG. 1 shows physical layer identity (PCI) constructions in Long-Term Evolution (LTE) and the fifth-generation cellular network technology (5G NR).

The following description describes methods and apparatuses to allocate physical layer sub-cell identity in a wireless network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

Terms

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the invention may be implemented using different combinations of software, firmware, and/or hardware.

A wireless communication network (also referred to as a cellular network) is a network of devices communicating using radio waves (electromagnetic waves within the frequencies 30 KHz-300 GHz). A wireless communication may follow wireless communication standards, such as new radio (NR), LTE (Long-Term Evolution), LTE-Advanced (LTE-A), wideband code division multiple access (WCDMA), High-Speed Packet Access (HSPA). Furthermore, the communications between the devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the disclosure, the disclosure may apply to other wireless communication networks, including LTE operating in unlicensed spectrums, Multefire system, The Institute of Electrical and Electronics Engineers (IEEE) 802.11 systems.

A network device (ND) (also referred to as a network node or node, these terms are used interchangeably in this disclosure unless noted otherwise) is an electronic device in a wireless communication network via which a terminal device accesses the network and receives services therefrom. Examples of network nodes include an access point (AP), a NodeB, base station (BS), a multi-standard radio (MSR) radio node such as MSR BS, an evolved NodeB (eNodeB or eNB), a next generation node B (gNB), a master base station (MeNB), a secondary base station (SeNB), a network controller, a radio network controller (RNC), a core network node (e.g., a node for Access and Mobility Management function (AMF), Mobility Management Entity (MME), Mobile Switching Center (MSC), etc.), a base station controller (BSC), a road side unit (RSU), a relay, a donor node controlling relay, a base transceiver station (BTS), a transmission point, a transmission node, a remote radio unit (RRU), a remote radio head (RRH), a node in distributed antenna system (DAS), an Operations and Management (O&M) system, an Operations Support System (OSS), a Self-Organizing Network (SON), a positioning node (e.g., Enhanced-Serving Mobile Location Center (E-SMLC)), etc. One type of network device may be a low power node such as a femtocell and a picocell.

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station, a portable subscriber station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box, and a customer premise equipment (CPE). Note that while UEs are often used as examples of terminal devices in this disclosure, embodiments of the disclosure apply to other terminal devices as well.

A cell site (also referred to as a cell tower, cellular base station, or simply site) is a cellular-enabled network device site where antennae and network devices are placed (often on a radio mast, tower, or other raised structure) to create cells in a wireless network. While historically the antennae were omni-directional, nowadays directional antennae are prevalent. One or more antennae may cover one sector of the cell site (or a cell), and all the antennae cover applicable directions of the cell site. A network device at a cell site thus may have multiple sectors, each covering a cell. While currently a network device at a cell site often has three to six sectors, more sectors may be added per site (and/or per network device) in future deployment. Embodiments of the invention are not limited by the number of sectors supported by a network device at a cell site.

A physical layer identity (PCI) may identify a sector/cell of a network device at a cell site in the physical layer. The PCI can be expressed as a combination of a physical layer cell identity group (referred to as PCI-group, often denoted using physicalLayerCellIdGroup) and physical layer sub-cell identity (referred to interchangeably as PCI-ID, PCI-Sub-cell-ID, Sub-cell-ID, or Subcell ID, and often denoted using physicalLayerSubCellId). The physical layer cell identity group and physical layer sub-cell identity are derived from Secondary synchronization signal (SSS) and Primary synchronization signal (PSS), respectively. For example, one formula to determine a PCI is the following: PCI=[3*physicalLayerCellIdGroup]+physicalLayerSubCellId.

A sub-cell identity vector is a vector representing the sector sub-cell identities of a network device with multiple sectors. For a network device having three sectors, its sub-cell identity vector has three data elements; for a network device with four sectors, four data elements, and so on. Some existing standards limit a sub-cell identity to be an integer within the range of zero to two. Thus, a sub-cell identity vector for a network device with three sectors may be [0, 1, 2]; a sub-cell identity vector for a network device with four sectors, [0, 1, 2, 1], and so on. Embodiments of the invention are not limited to a particular range of sub-cell identity values.

Physical Layer Identity (PCI) Planning and Challenges

FIG. 1 shows physical layer identity (PCI) constructions in Long-Term Evolution (LTE) and the fifth-generation cellular network technology new radio (5G NR, or simply 5G, NR, and these terms are used interchangeably in this disclosure). In LTE, PCI at reference 152 is within the range of zero to 502, while in 5G NR, PCI at reference 154 is within the range of zero to 1,008. The physical layer cell identity groups, physicalLayerCellIdGroups, (within the ranges of zero to 167 for LTE and zero to 335 for 5G NR) and physical layer sub-cell identities, physicalLayerSubCellIds, (within the range of zero to two) are derived from Secondary synchronization signal (SSS) and Primary synchronization signal (PSS), respectively. The formula of PCI=[3*physicalLayerCellIdGroup]+physicalLayerSubCellId is applicable for both LTE and 5G NR in this example.

Figure 2:
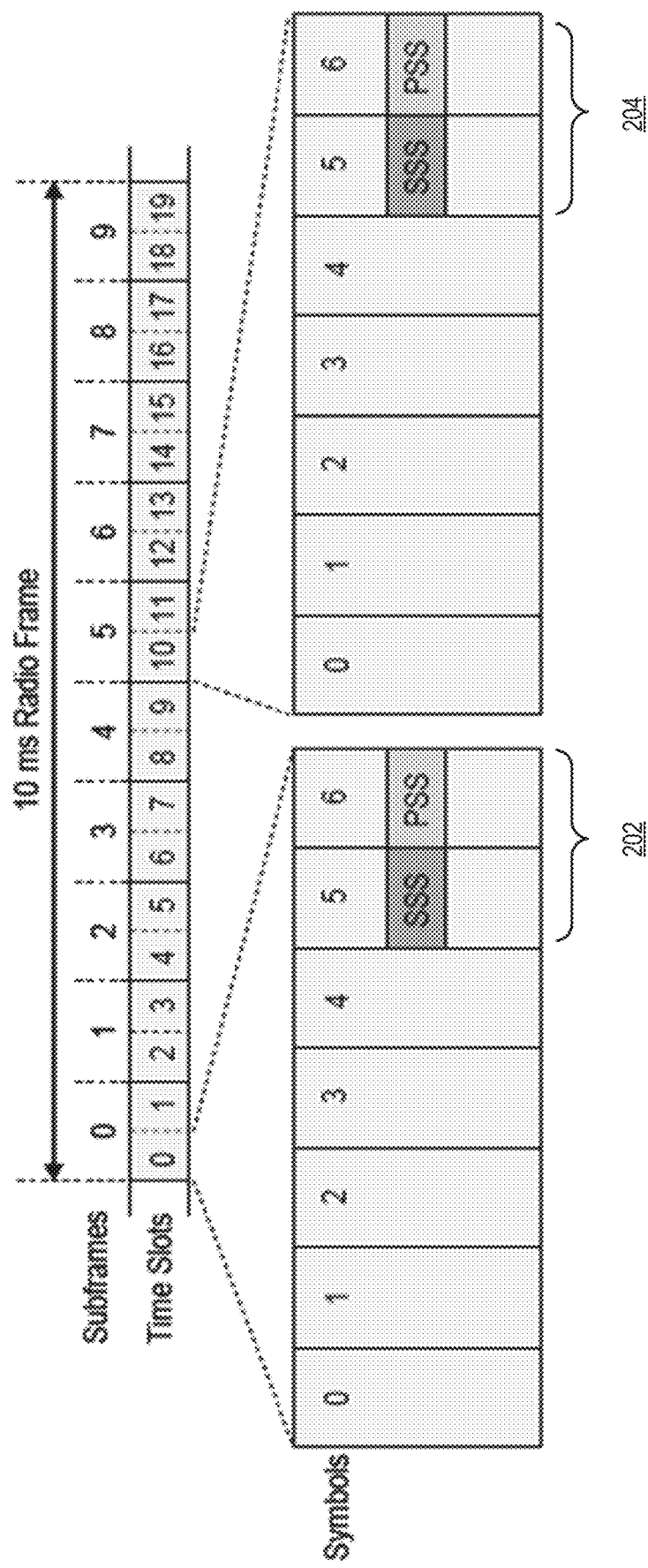
FIG. 2 shows exemplary timing of PSS and SSS for LTE frequency division duplex (FDD).

FIG. 2 shows exemplary timing of PSS and SSS for LTE frequency division duplex (FDD). This example assumes the normal cyclic prefix because there are seven symbols within each time slot. The SSS and PSS are within the last two symbols of the time slot as shown at references 202 and 204. The extended cyclic prefix follows a similar pattern except there are only six symbols within the time slot.

Figure 3:
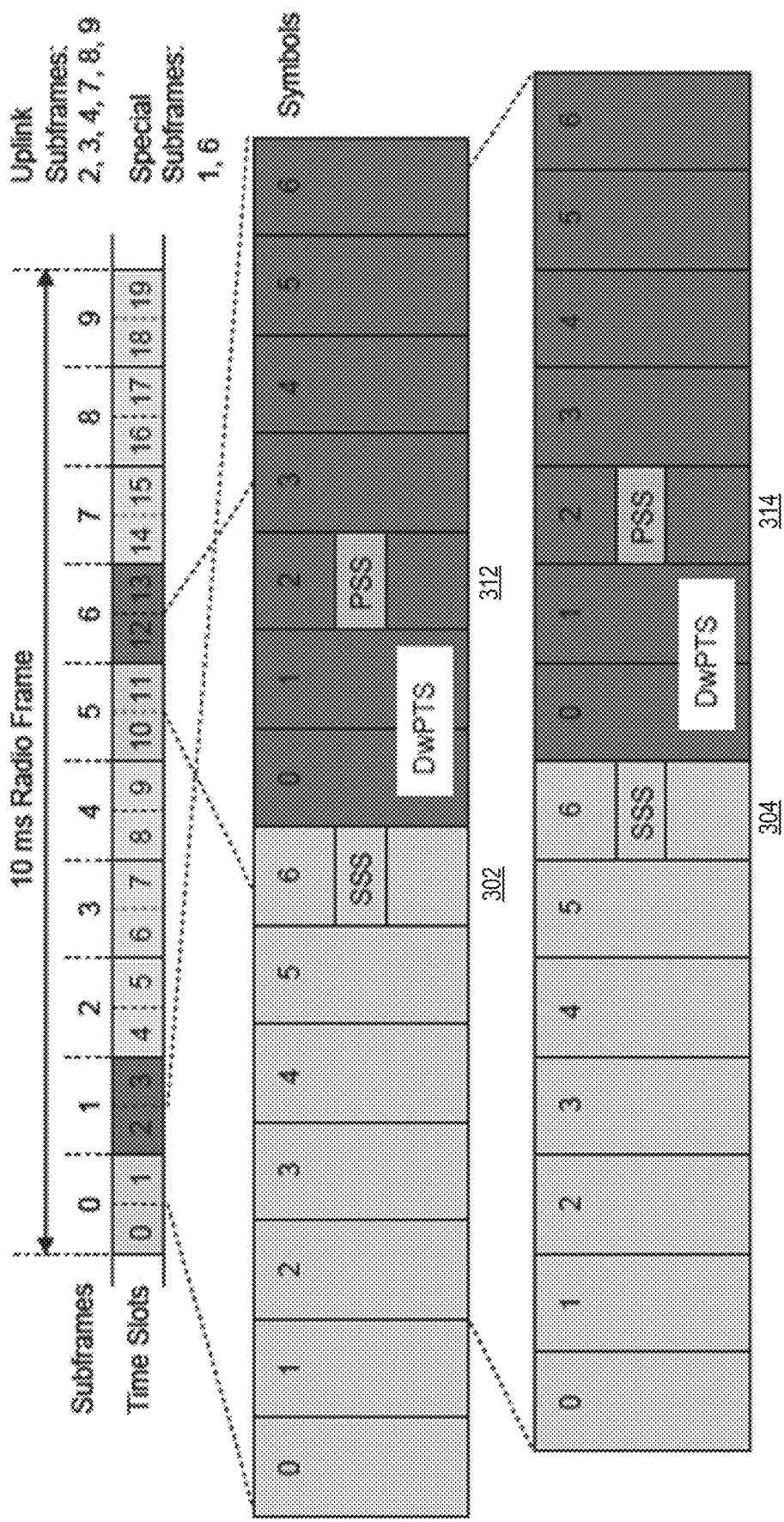
FIG. 3 shows exemplary timing of PSS and SSS for LTE time division duplex (TDD).

FIG. 3 shows exemplary timing of PSS and SSS for LTE time division duplex (TDD). This example assumes the normal cyclic prefix, uplink-downlink subframe configuration 0 and special subframe configuration 0. The SSS is within the last symbol of time slots 1 and 11 (shown at references 302 and 304, respectively), while the PSS is within the third symbol of time slots 2 and 12 (shown at references 312 and 314, respectively). The extended cyclic prefix follows a similar pattern except there are only 6 symbols within the time slot.

Note that while 6 and 7 symbols per slot are used as examples to explain embodiments of the invention, a person of ordinary skill in the art understands that another number of symbols per slot may be implemented in embodiments of the invention (e.g., 14 symbols per slot is also widely used).

Figure 4:
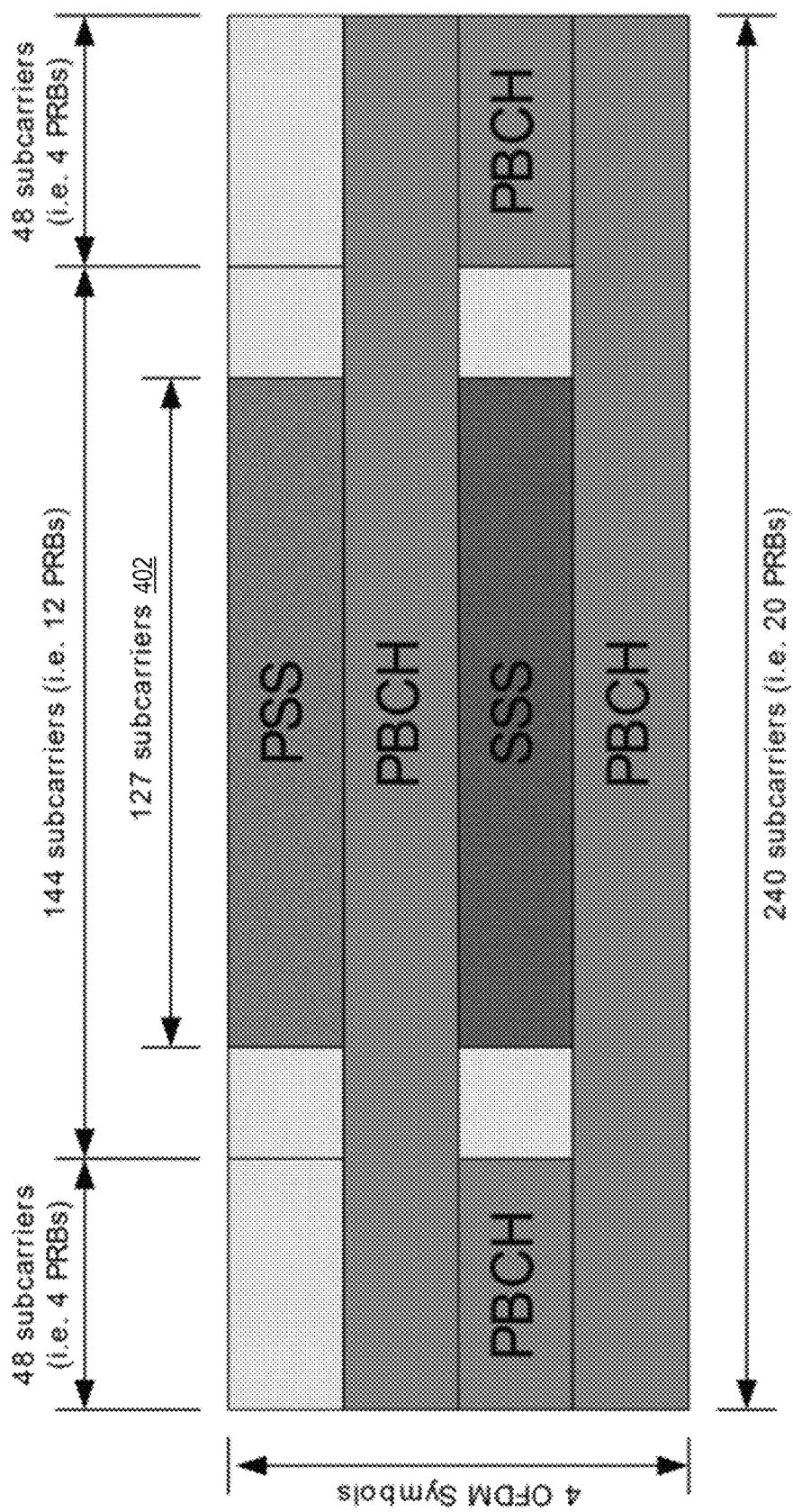
FIG. 4 shows exemplary relative spacing of PSS and SSS for 5G NR.

FIG. 4 shows exemplary relative spacing of PSS and SSS for 5G NR. The difference with LTE is that while LTE PSS is mapped to center 72 sub-carriers, NR PSS is mapped to 127 active sub-carriers at reference 402, and frequency of transmitting PSS depends on synchronization signal (SS) burst periodicity.

Figure 5:
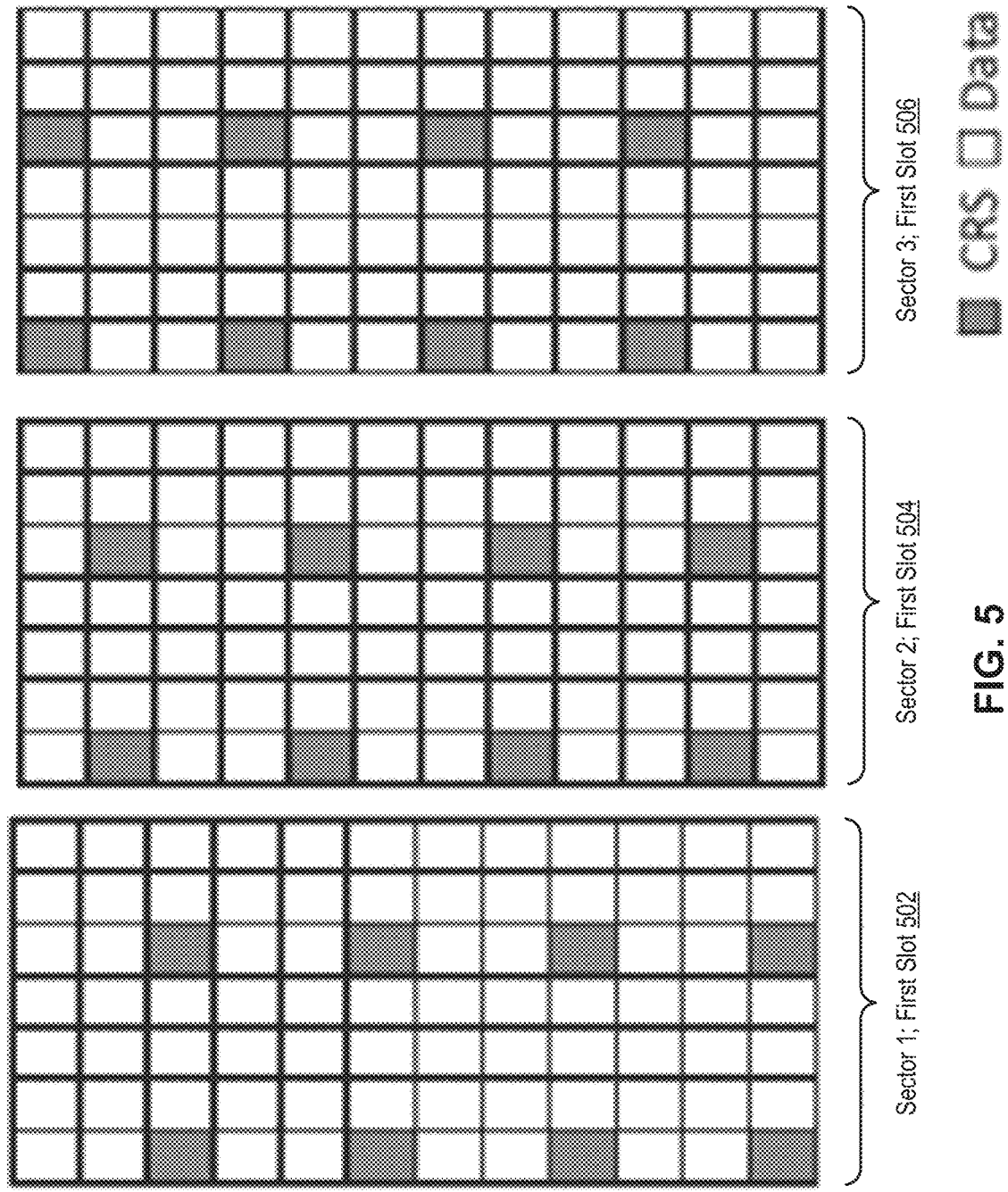
FIG. 5 shows an exemplary cell-specific Reference Signal (CRS) allocation in different subcarriers within a physical resource block (PRB) for LTE using different PSSs in different sectors.

For both LTE and 5G NR, Sub-cell-ID allocation defines the alignment of the Reference Signal or data resource element (RE) between neighbor cells. FIG. 5 shows an exemplary Cell-specific Reference Signal (CRS) allocation in different subcarriers within a physical resource block (PRB) for LTE using different PSSs in different sectors. The adjacent sectors (sectors 1 to 3 at references 502 to 506) use different PSSs, and the CRSs are allocated in different subcarriers within a PRB. The different physical layer sub-cell identities avoid conflicts between adjacent sectors of the same network device, or between neighbor sectors/cells.

The existing PCI planning approaches often aim at maximizing the PCI reuse distance to reduce PCI conflicts. For example, they may identify a suitable PCI (e.g., random assignment) or PCI-group (e.g., in MOD 3 or 6 planning) to yield the maximum PCI reuse distance. Yet these approaches fail to address the PSS interference issue, which affects the performance of terminal devices when they receive signals from two different cells/sectors with the same Sub-cell-IDs.

Figure 6:
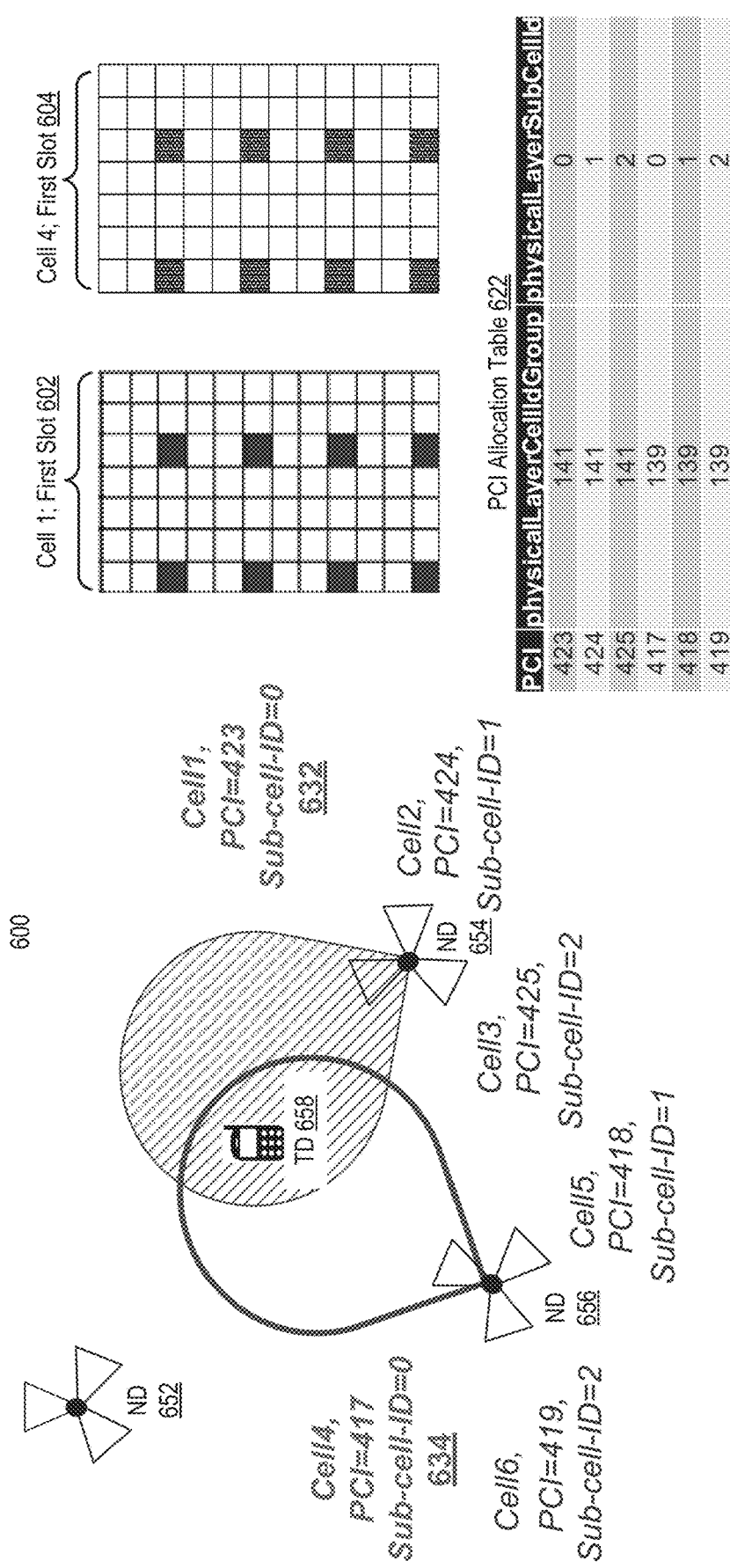
FIG. 6 shows Sub-cell-ID collisions between neighbor cells in a wireless network.

FIG. 6 shows Sub-cell-ID collisions between neighbor cells in a wireless network. The wireless network 600 includes three network devices (NDs) at references 652, 654, and 656, and a terminal device (TD) at reference 658 being served by these NDs. Each of the three network devices 652 to 656 has three sectors (cells). The sectors of ND 654 are identified as cells 1 to 3, while the sectors of ND 656 are identified as cells 4 to 6. Each sector has a unique PCI, and the PCI allocation table at reference 622 shows the PCI allocation for NDs 654 and 656. As shown, the Sub-cell-IDs are integers within the range of zero to two. The sub-cell identity vector for both NDs 654 and 656 is [0, 1, 2]. Based on the PCI allocation, cells 1 and 4 have the same sub-cell identity, Sub-cell-ID=0. The CRSs for cells 1 and 4 are allocated in the same subcarriers, as shown at references 602 and 604. At the TD 658, it receives reference signals from both cells 1 and 4 with the identical Sub-cell-ID as shown at references 632 and 634. The reference signals from cells 1 and 4 collide. Such collision degrades cell search performance of the TD 658.

Figure 7:
FIG. 7 shows Sub-cell-ID collisions between adjacent sectors of a network device in a wireless network.

The signal collision problem occurs to not only neighbor cells of different network devices, but also adjacent sectors of the same network device. For example, when the network device has more than three sectors and the Sub-cell-ID has only three values, adjacent sectors may be allocated the same Sub-cell-ID thus causing collision. FIG. 7 shows Sub-cell-ID collisions between adjacent sectors of a network device in a wireless network. PCIs are to be allocated to a network device at a cell site 750. The network device is to have four sectors, each to be allocated a Sub-cell-ID. It is determined that the PCI-group candidates include PCI-groups 139 and 141. Given that each PCI-group has only three unique Sub-cell-IDs (0, 1, and 2), both PCI-groups 139 and 141 will be allocated to the site. The question is to find the Sub-cell-ID allocation for the best performance as shown at reference 702.

Existing PCI planning approaches may recommend either the best four PCIs for the four sectors or the two best PCI groups, based on the best PCI re-use distance. For example, the existing PCI planning approaches may arrive at the PCI allocation shown at the PCI allocation table 722. Yet the PCI allocation with the best PCI re-user distance has two adjacent sectors with the same Sub-cell-ID as shown at reference 704, and the identical Sub-cell-ID for the two adjacent sectors causes PSS interference.

It is detrimental to the cell search procedure to allocate an identical Sub-cell-ID to adjacent sectors of the same network device or to neighbor cells of different network devices. The resulting PSS interference impacts all the subsequent procedures (e.g., initial access or handover) and associated performance indicators (e.g., retainability), and the impact includes a longer delay and/or a lower success rate. For example, delay or failure in cell search procedure during handover will interrupt or affect the user plane data flow and consequently end-user experience. Additionally, measured service level key performance indicator (KPI) will be negatively impacted as well.

The deployment of network devices with multiple sectors is increasing. For LTE deployment, all service providers are focusing on sector addition in existing sites and further densification in order to improve end-user experience and LTE user throughput. The result is reduction of inter-site distance and more sites with more than three sectors, particularly for the sites serving the area that require capacity augmentation. For 5G NR deployment, the achievable cell radius will be again lessened and thus reduce the inter-site distance because of 5G's comparatively higher frequencies (e.g., >6 GHz).

The complexity of the PSS interference aggravates when the number of sectors increases. For example, with 4-sector sites, there are 81 possible permutations of Sub-cell-ID allocation (i.e., 81 sub-cell identity vector candidates per site), assuming a Sub-cell-ID has three possible values (3×3×3×3=81). With 5-sector sites, the number increases to 243.

Yet no existing PCI planning approaches optimizes physical layer sub-cell identity allocation so that the cell search procedure performance may be improved. Doing the physical layer sub-cell identity allocation manually is time-consuming, given the vast number of permutations to compute. The manual process can't be scaled well when so many network devices with multiple sectors (e.g., four to six sectors per site) are deployed.

Embodiments of Physical Layer Sub-Cell Identity Allocation

Embodiments of the invention provide automatic ways to identify optimal sub-cell identity vector for a network device with multiple sectors. In one embodiment, from the possible sub-cell identity vector candidates for a network device at a site, the sub-cell identity vector candidates with adjacency conflict are removed. Then conflict measurements of neighbor cells are determined for the remaining sub-cell identity vector candidates. Finally, the optimal sub-cell identity vector for the network device is identified based on the measurements. Each of these operations is explained in more details herein below.

Note that embodiments of the invention do not modify existing standard or system specification for wireless networks. Indeed, they may be implemented to complement existing PCI planning approaches. For example, one may use the existing PCI planning approaches to identify PCI-groups for a network device with multiple sectors and use embodiments of the inventions to identify optimal Sub-cell-IDs. In FIG. 7, one may use the existing PCI planning approaches to identify PCI-groups 141 and 139 (e.g., because they provide the best PCI re-use distance, and use embodiments of the invention to identify the optimal sub-cell identity vector, say [0, 2, 0, 1], where the first, second, and fourth data elements of the vector maps to PCI-group 141, while the third data element maps to PCI-group 139.

The quantitative approach taken by embodiments of the invention may not completely mitigate the PSS interference due to Sub-cell-ID conflict as the Sub-cell-ID value is restricted within a very limited range (e.g., 3 values such as zero to two). Yet the minimization of the PSS interference is still valuable in PCI planning, and becomes more so with the ever-increasing density of network devices with high number sectors in wireless networks (LTE, 5G NR, and beyond).

Removal of Sector Adjacency Conflicts

FIG. 8 shows removal of sector adjacency conflicts per some embodiments of the invention. To deploy a network device with multiple sectors at a cell site, one may start the PCI planning with all possible Sub-cell-ID permutations at reference 802, where each permutation is a sub-cell identity vector for the network device.

For a network device with four sectors, as explained herein above, there are 81 possible permutations of Sub-cell-ID allocation. Yet not all permutations are efficient in terms of PCI-group allocation. For example, one possible sub-cell identity vector is [0, 0, 0, 0], which would consume four PCI-group numbers, one for each data element of the vector. Obviously one network device with four sectors taking four PCI-group numbers is inefficient for achieving the best PCI re-use distance. Indeed, for a network device with four sectors, any sub-cell identity vector that maps to more than two PCI-groups is inefficient for PCI-group allocation since each PCI-group has three Sub-cell-IDs and two PCI-groups are sufficient to differentiate Sub-cell-IDs. Thus, one may remove the permutations consuming more than two PCI-group numbers.

After the removal, the remaining Sub-cell-ID permutations are shown at reference 804, and each of the remaining Sub-cell-ID permutations only uses two PCI-group numbers. For example, the first sub-cell identity vector is [0, 2, 0, 1] (at reference 804), the second to fourth data element of which may map to one PCI-group, while the first data element maps to a second PCI-group. The PCI-group optimization may be achieved using existing PCI planning approaches.

Figure 9:
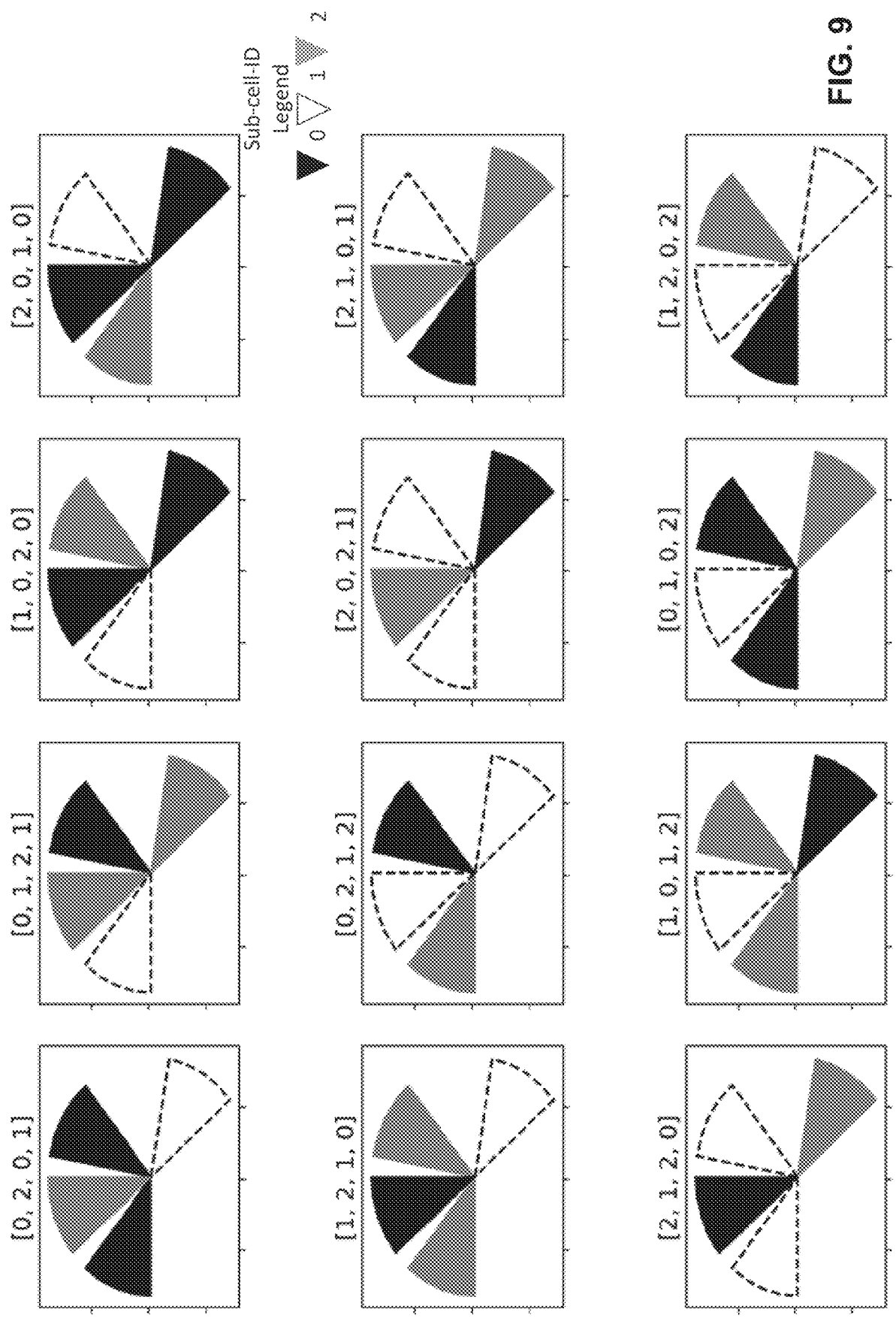
FIG. 9 shows the remaining Sub-cell-ID permutations after the removal of sector adjacency conflicts.

Then the remaining Sub-cell-ID permutations are examined to remove sector adjacency conflicts. When the same Sub-cell-ID value assigns to two or more adjacent sectors, it causes PSS interference as explained herein above relating to FIG. 7. The Sub-cell-ID permutations with sector adjacency conflicts thus need to be removed. For example, the second sub-cell identity vector is [0, 1, 1, 2] at reference 804, the adjacent sectors mapping to the second and third data elements have the same Sub-cell-ID value, 1, thus it needs to be removed. Same goes to the third to the sixth sub-cell identity vector as shown at reference 852. After the sector adjacency conflicts are removed, the updated Sub-cell-ID permutations are shown at reference 806. As shown, the removal reduces the Sub-cell-ID permutations from 36 at reference 804 to 12 at reference 806. The removal may be implemented in a computer program (e.g., a Python function or a function in another computer program). The updated Sub-cell-ID permutations are shown at FIG. 9.

Determination of Neighbor Cell Conflicts

The updated Sub-cell-ID permutations then may be further examined to reduce neighbor cell conflicts. As shown in FIG. 6 and related discussion, a neighbor cell may be allocated the same Sub-cell-ID with a sector of a network device and cause PSS interference. Such PSS interference occurs when the sector and neighbor cell also transmit at the same frequency. The transmission frequency may be measured using existing methods. For example, the transmission frequency of a sector or cell may be determined using an absolute radio-frequency channel number (ARFCN) in Global System for Mobile Communications (GSM) networks. It may be determined using UTRA Absolute Radio Frequency Channel Number (UARFCN) (where UTRA stands for Universal Mobile Telecommunications System (UMTS) Terrestrial Radio Access) or Evolved UTRA (E-UTRA) Absolute Radio Frequency Channel Number (EARFCN) in LTE. When two cells/sectors have the same ARFCN/UARFCN/EARFCN numbers, they are considered to transmit at the same frequency.

A neighbor cell or a sector of the neighbor cell that has the same Sub-cell-ID and the same frequency with that of a sector of a network device to allocate PCIs may be referred to as a conflicting neighbor cell. Note that the conflicting neighbor cell encompasses a conflicting neighbor "sector," which is at a site with multiple sectors and only one (or more) sector(s) is conflicting (not the whole site) with a sector of the network device.

A number of metrics may be used to compare the level of interference of possible Sub-cell-ID permutations and determine the optimal Sub-cell-ID allocation, and they are explained in more details below.

Number of Conflicts

This metric measures the number of neighbor cells with the same Sub-cell-ID and the same frequency with a sector of a network device to allocate PCIs. To derive the number, a first-tier neighbor polygon is identified. A first-tier neighbor is a closest neighbor cell in a given direction. From the first-tier neighbor polygon, the number of conflicting Sub-cell-IDs between the sectors of the network device and the first-tier neighbor can be calculated.

Distance Measurement of Conflicts

For a given conflict determined in the number of conflict determination, the distance between the site of the network device and the conflicting neighbor cell/sector may be determined. A measurement may be taken to factor in all the distance measurements of conflicts. For example, the sum of the distances, the average distance, the median, the maximum, and/or the minimum distance may be calculated as the overall measurement of the distance of conflicts.

Relative Orientation Measurement of Conflicts

For a given conflict determined in the number of conflict determination, the relative orientation between a sector of the network device and a conflicting neighbor cell/sector may be determined.

Figure 10:
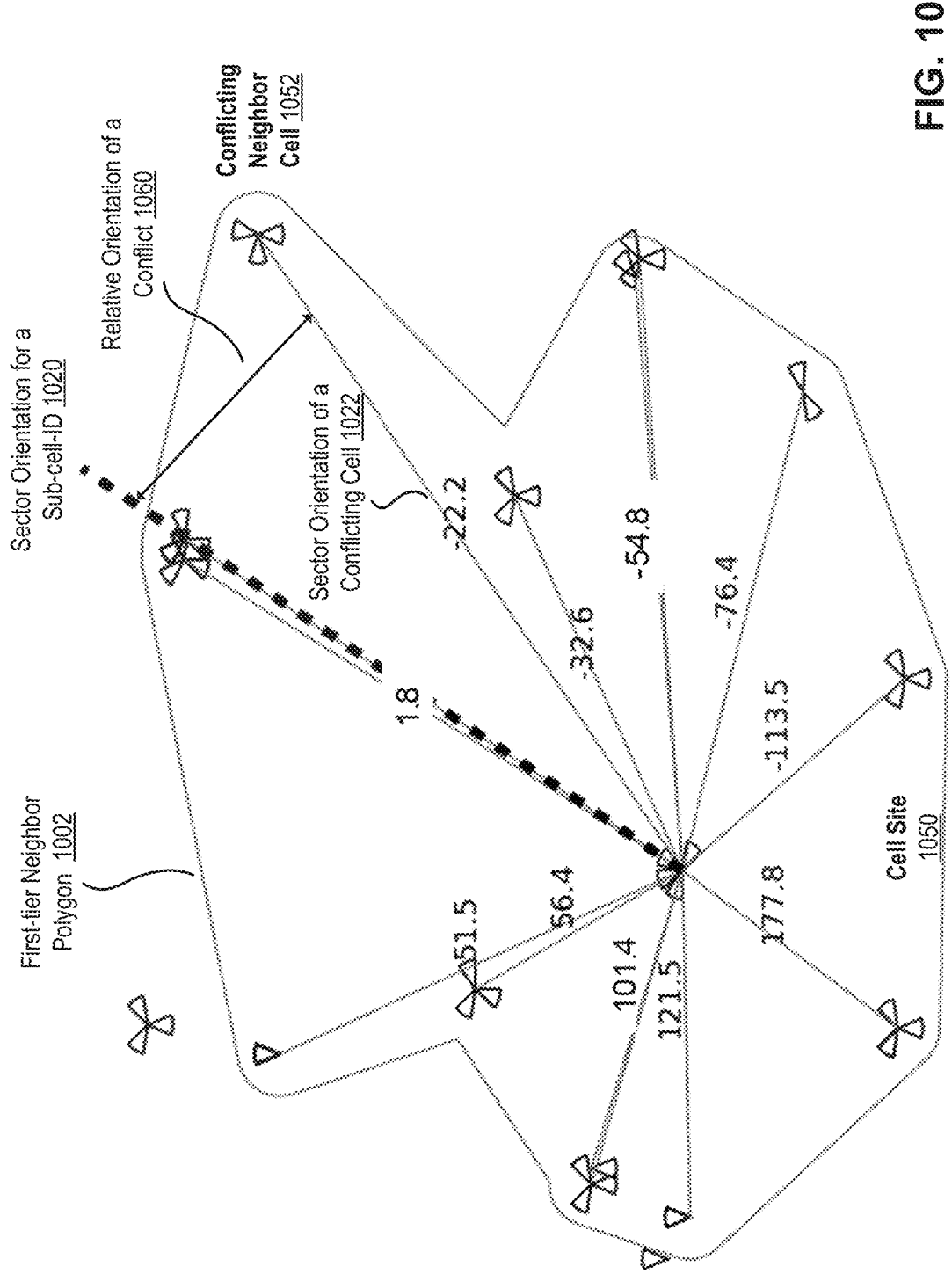
FIG. 10 shows determination of a relative orientation measurement of conflicts per some embodiments of the invention.

FIG. 10 shows determination of a relative orientation measurement of conflicts per some embodiments of the invention. In FIG. 10, the first-tier neighbor polygon 1002 is identified, centered at a site 1050 to implement a network device with multiple sectors. The orientation of a sector is compared with the orientation of a conflicting neighbor cell, and the relative orientation is the difference between the two orientations.

For example, the sector orientation for a Sub-cell-ID of the network device under planning is shown at reference 1020, and a conflicting neighbor cell with a sector having the same Sub-cell-ID is at reference 1052. The sector orientation of the conflicting neighbor cell of the sector is shown at reference 1022. The difference between the two orientations is the relative orientation of the conflict, which is shown at reference 1060. The relative orientation is −22.2° in this example. Obviously, the relative orientation may be measured in radian also.

A measurement may be taken to factor in all the relative orientation measurements of the conflicts. For example, the sum of the relative orientation measurements, the average, the median, the maximum, and/or the minimum relative orientation measurement may be calculated as the overall measurement of the relative orientation measurements of the conflicts.

Face factor Measurement of Conflicts

For a given conflict determined in the number of conflict determination, a face factor between a sector of the network device and a conflicting neighbor cell/sector may be determined. A face factor is a metric to identify if two sectors are facing each other. The face factor may be measured within the range of zero to 180 degrees (or zero to $\pi$ in radian), and the higher the value, the more two sectors face each other.

Figure 11:
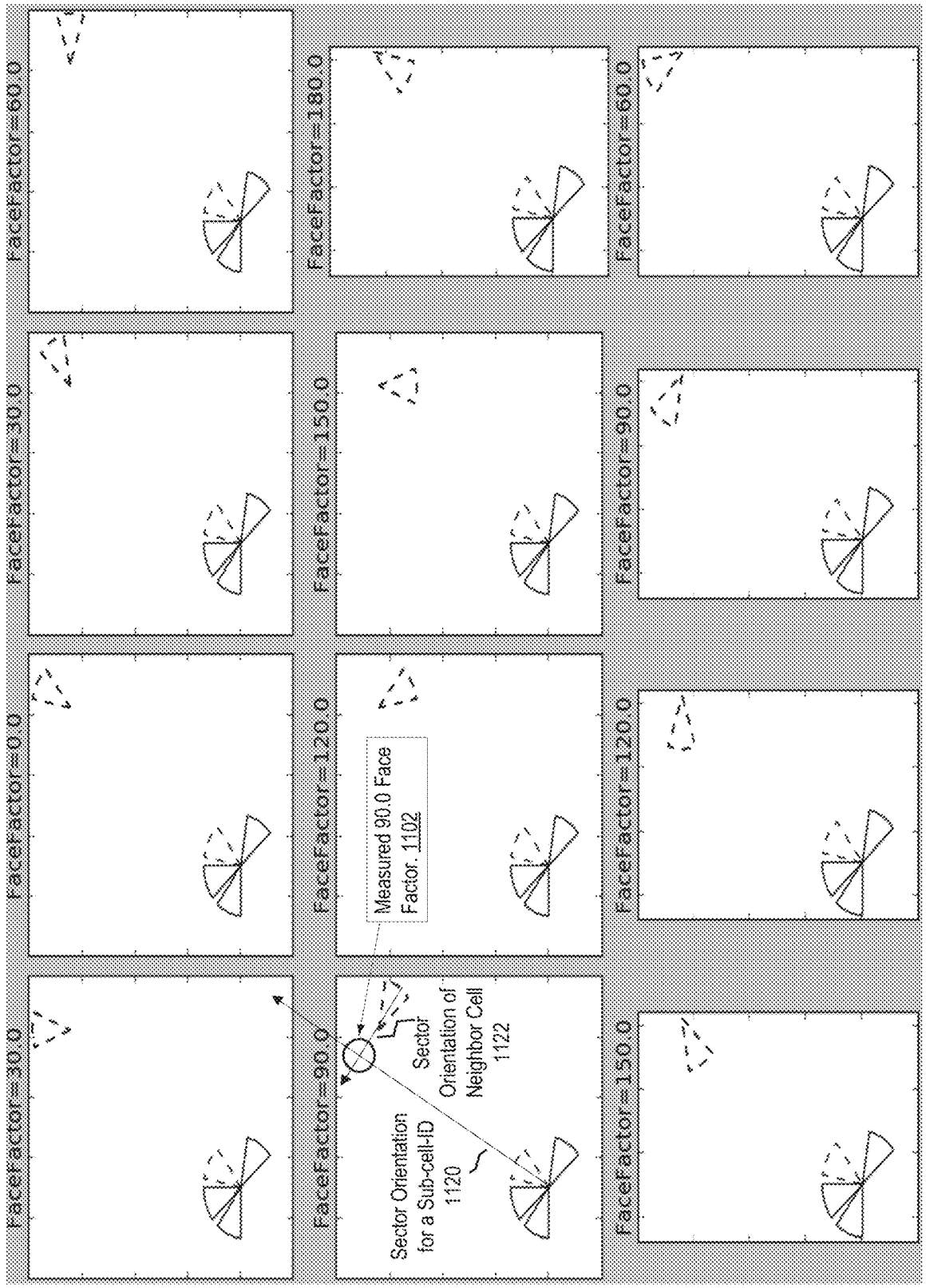
FIG. 11 shows face factor measurements in degree between two sectors per some embodiments of the invention.

FIG. 11 shows face factor measurements in degree between two sectors per some embodiments of the invention. In one example for the face factor=90 degrees, the conflicting sector of the network device under PCI planning has a sector orientation as shown at reference 1120, and the conflicting neighbor sector has a sector orientation as shown at reference 1122, and the face factor is measured to be 90 degrees as shown at reference 1102.

A measurement may be taken to factor in all the face factor measurements of the conflicts. For example, the sum of the face factor measurements, the average, the median, the maximum, and/or the minimum face factor measurement may be calculated as the overall measurement of the face factor measurements of the conflicts.

Measurements of Overlap Regions, and Related Building Area and Route Length

For a given conflict determined in the number of conflict determination, an overlap region between a sector of the network device and a conflicting neighbor cell/sector may be determined. The size of the overlap region between sector and cell/sector is a metric to measure the level of interference. A measurement may be taken to factor in all the overlap region measurements of the conflicts. For example, the sum of the overlap region measurements, the average, the median, the maximum, and/or the minimum overlap region measurement may be calculated as the overall measurement of the overlap regions of the conflicts.

Figure 12:
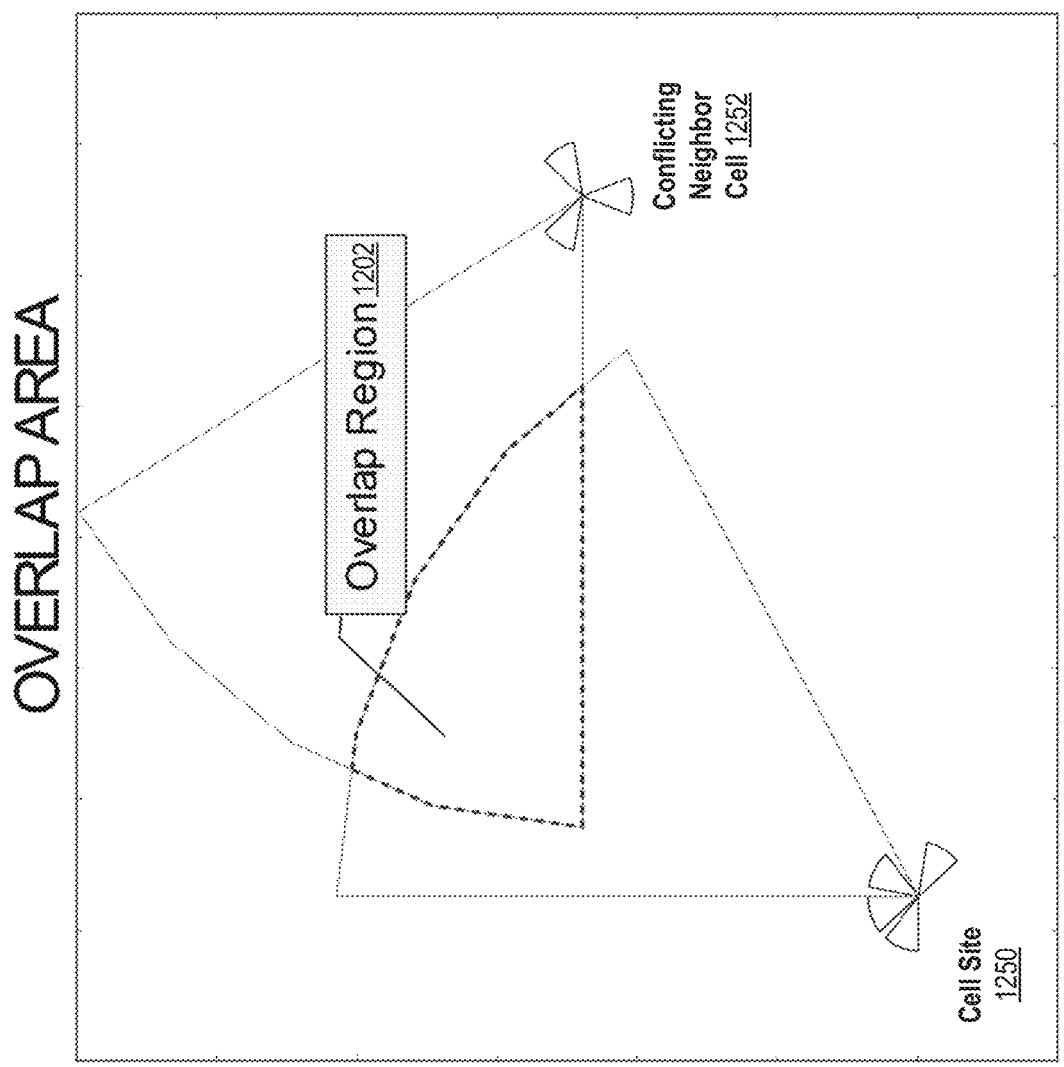
FIG. 12 shows an overlap region per some embodiments of the invention.

FIG. 12 shows an overlap region per some embodiments of the invention. The cell site 1250 and the conflicting neighbor cell 1252 have sectors with the identical Sub-cell-ID, and the beam coverages of the two sectors overlap as shown in the overlap region 1202 in the figure.

In one embodiment, the overlap region is estimated considering 0.8 of overshooting factor, which is defined as the ratio of average serving radial distance of a sector and first-tier neighbor distance. The first-tier neighbor distance is the mean distance between a site and first-tier neighbors for a given range of directions/orientations. The overshooting factor may be set to a different value to arrive at a different overlap region between the sector and neighbor cell/sector. For example, the overshooting factor may be adjusted based on the mean inter-site distance of a given cluster. A cluster is a group of cells to cover an area (e.g., seven cells forming a cluster to cover the area), and the inter-site distance is the distance between cells of the cluster.

Figure 13:
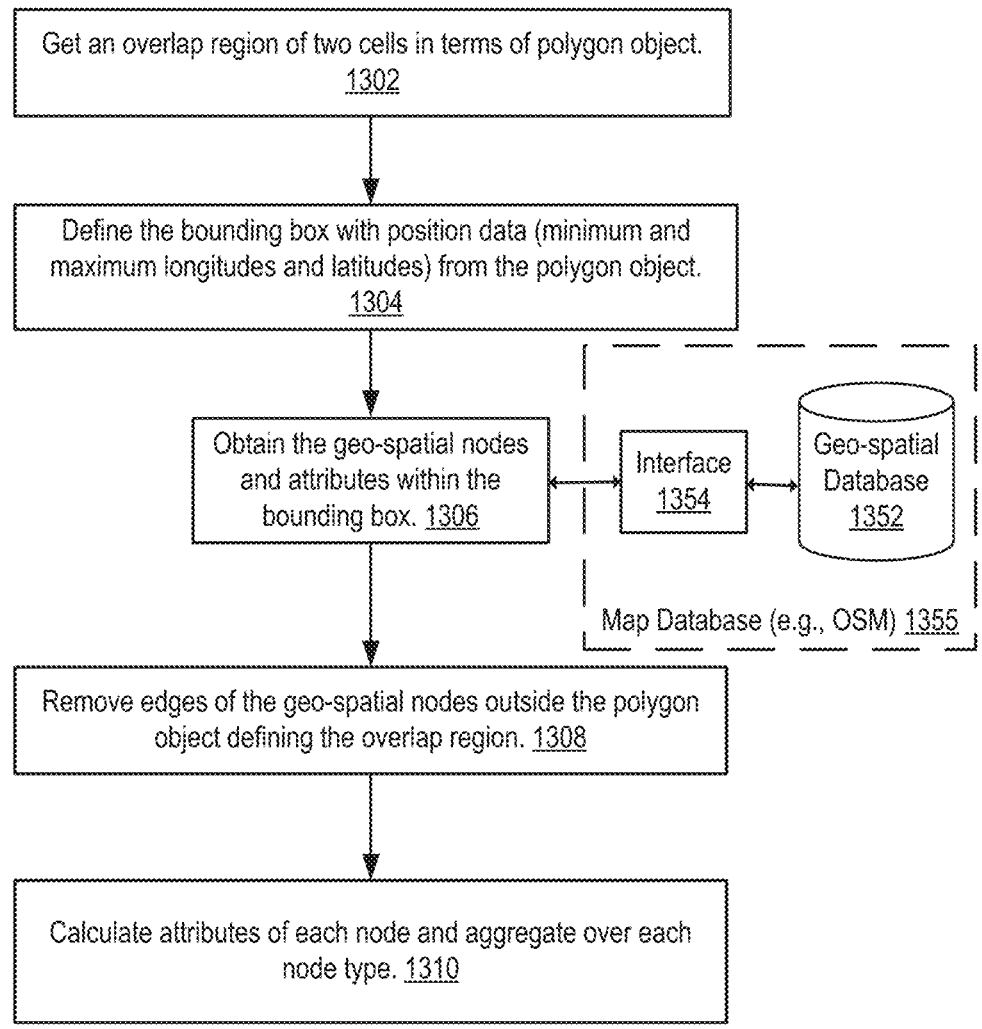
FIG. 13 shows a flow diagram to collect attributes of geospatial nodes per some embodiments of the invention.

After the overlap region is determined, geospatial nodes (objects) within the region that may affect communications are determined, and the determination uses map data of the region. The map data is available through different maps that may be used by different applications/programs. For example, OpenStreetMap (OSM), a collaborative project that creates a free editable map of the world may be used; and other proprietary maps may be used as well. FIG. 13 shows a flow diagram to collect attributes of geospatial nodes per some embodiments of the invention.

The operations start at reference 1302, where a polygon object from an overlap region between two sectors/cells is derived. The derivation is based on latitude and longitude of the overlap region. Then at reference 1304, a bounding box is defined with position data such as the minimum and maximum longitudes and latitudes from the polygon object.

At reference 1306, a map database system 1355 is queried to obtain the geo-spatial nodes and attributes within the bounding box at reference 1306. The map database system 1355 may be an open source one such as OSM, a proprietary one, or the combination thereof. The map database system 1355 includes a geo-spatial database 1352, and an interface 1354, through which the geo-spatial database 1352 is queried.

At reference 1308, the edges of the geo-spatial nodes outside the polygon object defining the overlap region are removed. Then the attributes of each node are calculated, and they are aggregated over each geo-spatial node type at reference 1310. The geo-spatial node types include building structures (e.g., buildings of various types), paths/roads, and terrains (e.g., mountains and valleys).

For each node geo-spatial node type, one or more measurements are aggregated. For example, for building structures, the area measurements (e.g., in square meters or miles) of the building structures within the overlap region may be aggregated as one measurement of the building area of the overlap region. For paths/roads, the length measurements (e.g., in meters or miles) of the paths/roads that pass through the overlap region may be aggregated as one measurement of the route length of the overlap region. The one measurement that factors in all the overlap region measurements of the conflicts may be the sum of the respective area/length measurements, the average, the median, the maximum, and/or the minimum of the area and length measurement, for building structures and path/roads, respectively.

Figure 14:
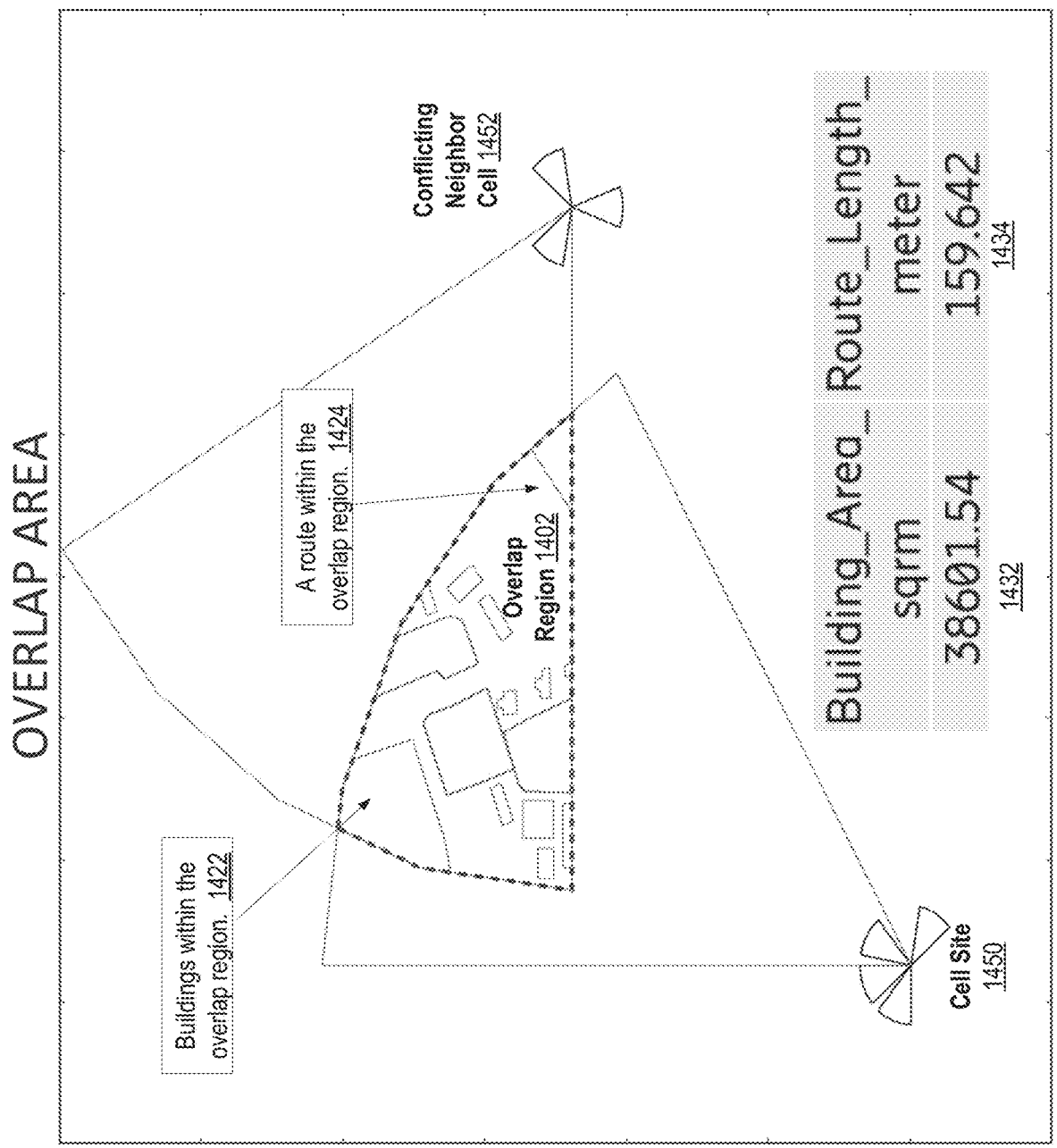
FIG. 14 shows an overlap region with buildings and a road identified and measurements taken per some embodiments of the invention.

The metrics, such as building area and route length, are important to prioritize a conflict over another for possible interference. For example, FIG. 12 shows the overlap region 1202 with no known building structures or paths/roads. In contrast, FIG. 14 shows an overlap region with buildings and a road identified and measurements taken per some embodiments of the invention. As shown at reference 1402, the overlap region 1402 is between the cell site 1450 and its conflicting neighbor cell 1452. Numerous buildings are identified in the overlap region as shown at reference 1422, and one road is identified as shown at reference 1424.

The building area measurements are aggregated as a single measurement of the building area, which is 38,601,54 square meters in this example at reference 1432. The route length measurements are aggregated as a single measurement of the route length, which is 159.642 meters in this example at reference 1434.

The overlap region 1402 is more important than the overlap region 1202 to reduce the Sub-cell-ID conflicts as the former has a much higher probability of the existence of mobile users and the potential data generation volume of the former should be much higher too. Thus, using the single building area measurement and the single route length measurement (e.g., the ones shown at references 1432 and 1434), one may determine the relative impotency of different overlap regions.

Identification of the Optimal Sub-Cell Identity Vector

The metrics discussed herein above are to be used to compare the level of interference of possible Sub-cell-ID permutations and determine the optimal Sub-cell-ID allocation. One way to use the measurements obtained above (e.g., a single measurement per factor) is to drive a single value from all the measurements for each of the candidates (e.g., remaining Sub-cell-ID permutation candidates obtained at reference 806), and use the single value to find the optimal Sub-cell-ID allocation. The process includes metric selection, measurement normalization, and quantitative selection.

Metric Selection

FIG. 15 shows a table that includes a number of measurements for a set of Sub-cell-ID permutations per some embodiments of the invention. The conflict measurement table 1522 includes a set of metrics and their measurements for the set of Sub-cell-ID permutations at reference 806 of FIG. 8. At column 1502, the Sub-cell-ID permutations are indexed from zero to 11, and the Sub-cell-ID permutations (sub-cell identity vectors) are listed at column 1504.

The set of metrics and corresponding measurements for each Sub-cell-ID permutation are shown from columns 1506 to 1516. The set of metrics includes the number of conflicts (Conflict_Count) at reference 1506, the average distance of conflicts (Distance_Meter_mean) at reference 1508, the average relative orientation of conflicts (Relative_Orientation_mean) at reference 1510, the average face factor of conflicts (Face_Factor_mean) at reference 1512, the total building area of overlap regions in square meters (Building_Area_Sqrm_sum) 1514, and the total route length of the overlap regions in meter (Route_Length_meter_sum) 1516.

Note that while this table includes average and sum of the metrics, other embodiments may use median, minimum, maximum, or other arithmetic operations over the measurements of conflicts. Also, other embodiments may use more or less metrics in selecting the optimal Sub-cell-ID permutation. For example, while this table does not include the metric of the overlap regions, other embodiments may include that metric and other metrics known in the art.

Measurement Normalization

After the measurements for the set of metrics are collected, these measurements are then normalized. FIG. 16 shows a table that includes normalized measurements for a set of Sub-cell-ID permutations per some embodiments of the invention. The normalized conflict measurement table 1622 is similar to the conflict measurement table 1522, with the same Sub-cell-ID permutation index 1502 and Sub-cell-ID permutation 1504, but the measurements are normalized (also referred to as "scaled" and the two terms are used interchangeably) in the range from zero to one or one to zero, depending on the impact of the metric as shown in columns 1606 to 1616.

For example, the number of conflicts is normalized in the range from zero to one (the lower the better since the PSS interference will be less with less conflicts) while the average distance of conflicts is normalized in the range from one to zero (the higher the better since the PSS interference will be less when the conflicting neighbor cells are further away).

While the normalization uses the range of [0, 1] as an example, other ranges may be implemented in embodiments of the invention.

Quantitative Selection

The normalized measurements of various metrics may be combined to reach a single interference indicator for a Sub-cell-ID permutation. FIG. 17 shows a table that includes normalized measurements with calculated Sub-cell-ID conflict values for a set of Sub-cell-ID permutations per some embodiments of the invention. The normalized conflict measurement table with calculated ID conflict values 1722 is similar to the normalized conflict measurement table 1622, and one addition is the row 1702, which indicates the final scores for each of the set of Sub-cell-ID permutations.

In this example, a score for a Sub-cell-ID permutation is simply a sum of the normalized measurements for the considered metrics. The Sub-cell-ID permutation with the lowest score is selected to be the optimal Sub-cell-ID permutation that is considered to cause the least overall PSS interference, and the optimal Sub-cell-ID is permutation is [0, 1, 2, 1] as shown at reference 1750.

While this example uses the sum of the normalized measurements to select the optimal Sub-cell-ID permutation, other arithmetic operations may be used for the quantitative selection. For example, different weights may be applied to different metrics, so that more important metrics for a given scenario may take higher priorities over less important ones. By adjusting the weights, the embodiments of the invention may be flexible enough to cover a wide variety of scenarios.

Additionally, while this example selects the Sub-cell-ID permutation with the minimum value of the score as the choice, some embodiments may select the maximum value of a different score derived from another set of metrics to select the Sub-cell-ID permutation.

Some Embodiments

The operations in the flow diagrams may be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 18:
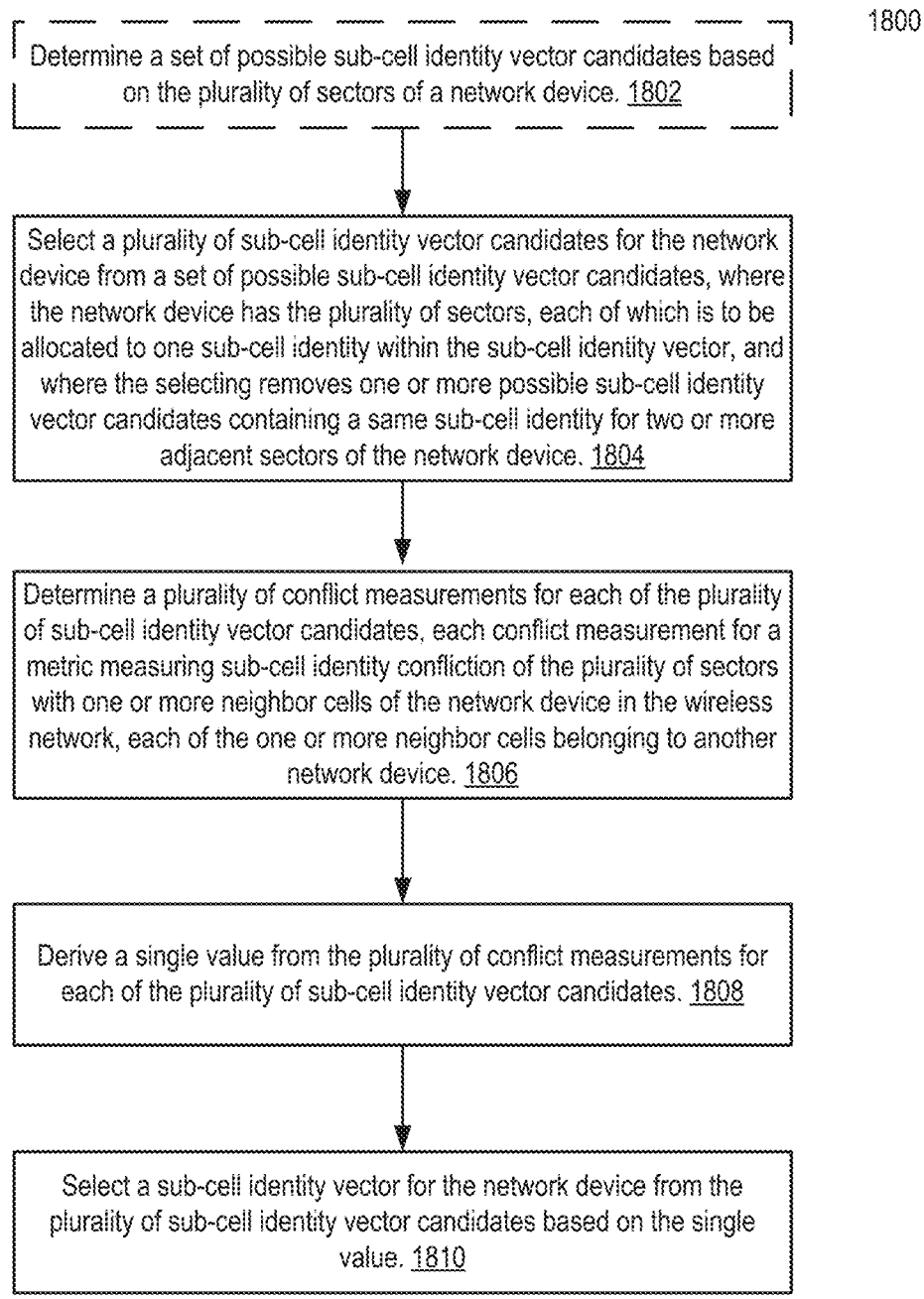
FIG. 18 is a flow diagram illustrating the operations at a network device to allocate physical layer sub-cell identity according to some embodiments of the invention.

FIG. 18 is a flow diagram illustrating the operations at a network device to allocate physical layer sub-cell identity according to some embodiments of the invention. The network device is to be deployed (or has been deployed) at a cell site, where the network device has multiple sectors (e.g., the cell site or the network device having multiple directional antennae, each over a direction). The allocation of physical layer sub-cell identity of method 1800 may be performed by the network device, or by an electronic device outside of the network device designated to perform the allocation of physical layer sub-cell identity.

Optionally at reference 1802, a set of possible sub-cell identity vector candidates is determined based on the plurality of sectors of the network device. The set of possible sub-cell identity vector candidates may include all possible Sub-cell-ID permutations as shown at reference 802 in one embodiment. Alternatively, the set of possible sub-cell identity vector candidates are the ones after Sub-cell-ID permutations with inefficient PCI-group allocation are removed, as shown at reference 804.

At reference 1804, a plurality of sub-cell identity vector candidates for the network device are selected from a set of possible sub-cell identity vector candidates, where the network device has the plurality of sectors, each of which is to be allocated to one sub-cell identity within the sub-cell identity vector, and where the selecting removes one or more possible sub-cell identity vector candidates containing a same sub-cell identity for two or more adjacent sectors of the network device. The operation removes sector adjacency conflicts, details of which are discussed herein above relating to FIGS. 8 to 9.

At reference 1806, a plurality of conflict measurements for each of the plurality of sub-cell identity vector candidates, each conflict measurement for a metric measuring sub-cell identity confliction of the plurality of sectors with one or more neighbor cells of the network device in the wireless network, each of the one or more neighbor cells belonging to another network device. The selection of the plurality of conflict measurements is discussed herein relating to Section of "Determination of Neighbor Cell Conflicts," FIGS. 10 to 14, and also FIG. 19 herein below.

At reference 1808, a single value is derived from the plurality of conflict measurements for each of the plurality of sub-cell identity vector candidates. At reference 1810, a sub-cell identity vector for the network device is selected from the plurality of sub-cell identity vector candidates based on the single value.

In one embodiment, the derivation of the single value includes normalizing each of the plurality of conflict measurements to be within a same range of values and combining the plurality of conflict measurements into the single value after the normalizing. In one embodiment, the combination of the plurality of conflict measurements uses different weights for at least a subset of the plurality of conflict measurements.

The derivation of the single value and the selection of the sub-cell identity vector, including the normalization and combination, are discussed in more details relating to FIGS. 15 to 17.

FIG. 19 is a flow diagram illustrating the selection of metrics for measuring sub-cell identity confliction according to some embodiments of the invention. The operation at reference 1806 includes selecting one or more metrics to quantify sub-cell identity confliction.

The metrics include one or more of the ones shown at references 1902 to 1914: a number of conflicts of the plurality of sectors with the one or more neighbor cells at reference 1902; a distance measurement of the number of conflicts at reference 1904; a relative orientation measurement of the number of conflicts at reference 1906; a face factor measurement for face factor between the plurality of sectors and the one or more neighbor cells, wherein a face factor measures a relative orientation between a sector and a neighbor cell at reference 1908; a size measurement of one or more overlap regions between the plurality of sectors and the one or more neighbor cells at reference 1910; a route length measurement for route length in the one or more overlap regions between the plurality of sectors and the one or more neighbor cells at reference 1912; and a size measurement for building areas in the one or more overlap regions between the plurality of sectors and the one or more neighbor cells at reference 1914.

Embodiments of the invention provide automated radio network physical resource planning techniques enhanced with geospatial data to achieve the best possible Sub-cell-ID allocation plan through quantitative assessment and prioritization of possible conflicts using a set of metrics to improve cell search procedure during initial access and mobility in a wireless network deployment (e.g., LTE, 5G NR, and beyond).

The advantages of embodiments of the invention include the following: reduce the probability of Sub-cell-ID based conflicts; improve cell search procedure, and positively impact subsequent events and procedures; improve service level agreed accessibility, retainability, and mobility KPIs; complement/enhance existing PCI planning approaches.

Additionally, embodiments of the invention may be implemented distributivity at different network devices or cell sites with multiple sectors or centrally at an electronic device in charge of managing a wireless network. They may be implemented as a software program package integrated with other applications. The embodiments of the invention are also vendor/operator independent, and any vendor or operator may use the embodiments for PCI planning By removing the manual assessment of all possible Sub-cell-ID permutations, the PCI planning with embodiments of the invention is scalable and efficient.

Network Environments Under which Embodiments of the Invention May Operate

Figure 20A:
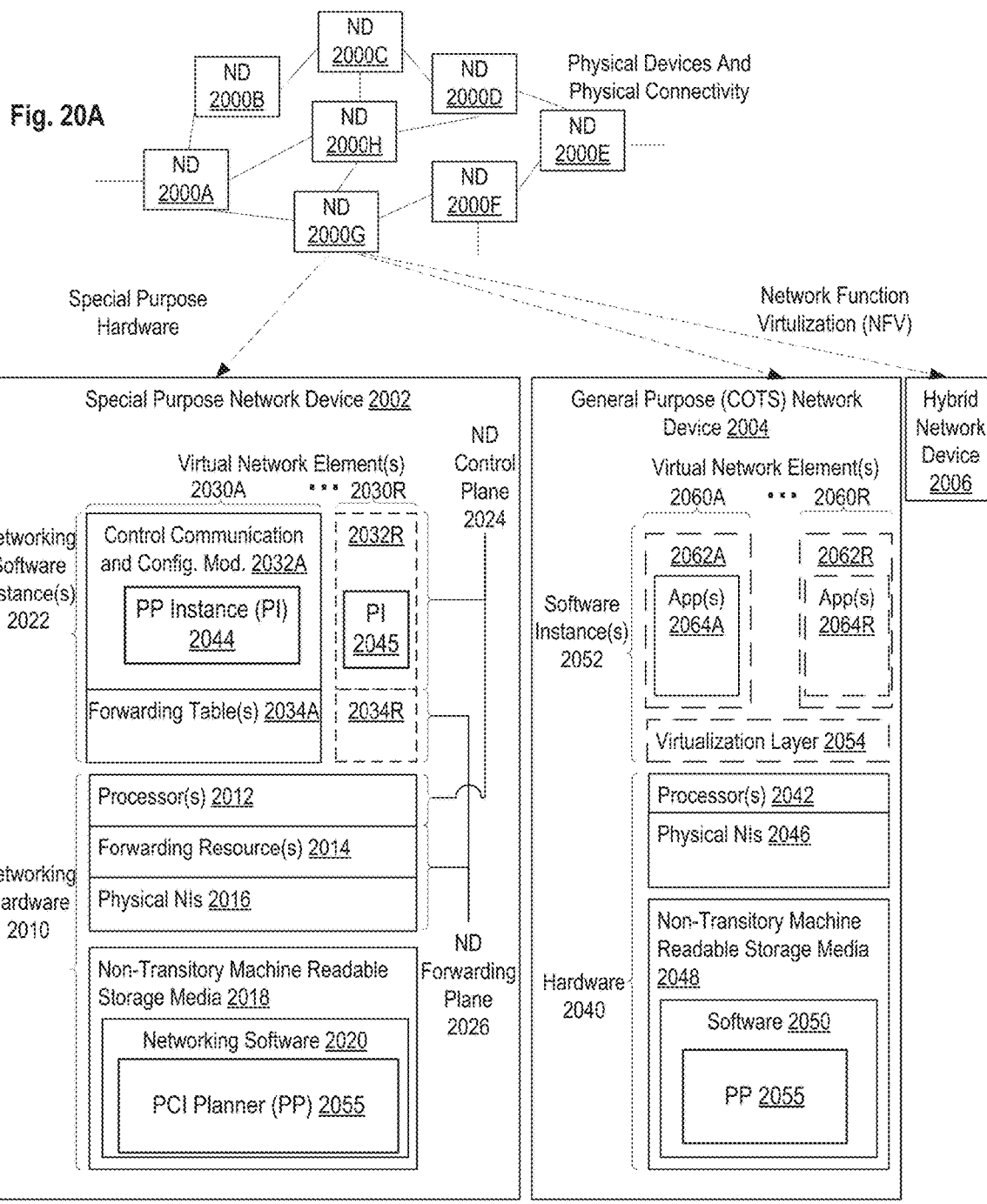
FIG. 20A illustrates connectivity between network devices (NDs) within an exemplary network, as well as three exemplary implementations of the NDs, according to some embodiments of the invention.

FIG. 20A illustrates connectivity between network devices (NDs) within an exemplary network, as well as three exemplary implementations of the NDs, according to some embodiments of the invention. FIG. 20A shows NDs 2000A-H, and their connectivity by way of lines between 2000A-2000B, 2000B-2000C, 2000C-2000D, 2000D-2000E, 2000E-2000F, 2000F-2000G, and 2000A-2000G, as well as between 2000H and each of 2000A, 2000C, 2000D, and 2000G. These NDs are physical devices, and the connectivity between these NDs can be wireless or wired (often referred to as a link). An additional line extending from NDs 2000A, 2000E, and 2000F illustrates that these NDs act as ingress and egress points for the network (and thus, these NDs are sometimes referred to as edge NDs; while the other NDs may be called core NDs).

Two of the exemplary ND implementations in FIG. 20A are: 1) a special-purpose network device 2002 that uses custom application-specific integrated-circuits (ASICs) and a special-purpose operating system (OS); and 2) a general purpose network device 2004 that uses common off-the-shelf (COTS) processors and a standard OS.

The special-purpose network device 2002 includes networking hardware 2010 comprising a set of one or more processor(s) 2012, forwarding resource(s) 2014 (which typically include one or more ASICs and/or network processors), and physical network interfaces (NIs) 2016 (through which network connections are made, such as those shown by the connectivity between NDs 2000A-H), as well as non-transitory machine readable storage media 2018 having stored therein networking software 2020. During operation, the networking software 2020 may be executed by the networking hardware 2010 to instantiate a set of one or more networking software instance(s) 2022. Each of the networking software instance(s) 2022, and that part of the networking hardware 2010 that executes that network software instance (be it hardware dedicated to that networking software instance and/or time slices of hardware temporally shared by that networking software instance with others of the networking software instance(s) 2022), form a separate virtual network element 2030A-R. Each of the virtual network element(s) (VNEs) 2030A-R includes a control communication and configuration module 2032A-R (sometimes referred to as a local control module or control communication module) and forwarding table(s) 2034A-R, such that a given virtual network element (e.g., 2030A) includes the control communication and configuration module (e.g., 2032A), a set of one or more forwarding table(s) (e.g., 2034A), and that portion of the networking hardware 2010 that executes the virtual network element (e.g., 2030A). In one embodiment, the networking software 2020 comprises a PCI Planner 2055, which performs operations discussed herein relating to FIGS. 18-19. The PCI planner 2055 may be instantiated within virtual network elements as PCI Planner Instances 2044 and 2045 as shown in the figure.

The special-purpose network device 2002 is often physically and/or logically considered to include: 1) a ND control plane 2024 (sometimes referred to as a control plane) comprising the processor(s) 2012 that execute the control communication and configuration module(s) 2032A-R; and 2) a ND forwarding plane 2026 (sometimes referred to as a forwarding plane, a data plane, or a media plane) comprising the forwarding resource(s) 2014 that utilize the forwarding table(s) 2034A-R and the physical NIs 2016. By way of example, where the ND is a router (or is implementing routing functionality), the ND control plane 2024 (the processor(s) 2012 executing the control communication and configuration module(s) 2032A-R) is typically responsible for participating in controlling how data (e.g., packets) is to be routed (e.g., the next hop for the data and the outgoing physical NI for that data) and storing that routing information in the forwarding table(s) 2034A-R, and the ND forwarding plane 2026 is responsible for receiving that data on the physical NIs 2016 and forwarding that data out to the appropriate ones of the physical NIs 2016 based on the forwarding table(s) 2034A-R.

Figure 20B:
FIG. 20B illustrates an exemplary way to implement a special-purpose network device according to some embodiments of the invention.

FIG. 20B illustrates an exemplary way to implement the special-purpose network device 2002 according to some embodiments of the invention. FIG. 20B shows a special-purpose network device including cards 2038 (typically hot pluggable). While in some embodiments the cards 2038 are of two types (one or more that operate as the ND forwarding plane 2026 (sometimes called line cards), and one or more that operate to implement the ND control plane 2024 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 2036 (e.g., a first full mesh coupling the line cards and a second full mesh coupling all of the cards).

Returning to FIG. 20A, the general-purpose network device 2004 includes hardware 2040 comprising a set of one or more processor(s) 2042 (which are often COTS processors) and physical NIs 2046, as well as non-transitory machine-readable storage media 2048 having stored therein software 2050. During operation, the processor(s) 2042 execute the software 2050 to instantiate one or more sets of one or more applications 2064A-R. While one embodiment does not implement virtualization, alternative embodiments may use different forms of virtualization. For example, in one such alternative embodiment the virtualization layer 2054 represents the kernel of an operating system (or a shim executing on a base operating system) that allows for the creation of multiple instances 2062A-R called software containers that may each be used to execute one (or more) of the sets of applications 2064A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 2054 represents a hypervisor (sometimes referred to as a virtual machine monitor (VMM)) or a hypervisor executing on top of a host operating system, and each of the sets of applications 2064A-R is run on top of a guest operating system within an instance 2062A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 2040, directly on a hypervisor (in which case the unikernel is sometimes described as running within a LibOS virtual machine), or in a software container, embodiments can be implemented fully with unikernels running directly on a hypervisor represented by virtualization layer 2054, unikernels running within software containers represented by instances 2062A-R, or as a combination of unikernels and the above-described techniques (e.g., unikernels and virtual machines both run directly on a hypervisor, unikernels and sets of applications that are run in different software containers). Note that the networking software 2050 comprises the PCI planner 2055, whose operations are discussed herein relating to the network device 2002.

The instantiation of the one or more sets of one or more applications 2064A-R, as well as virtualization if implemented, are collectively referred to as software instance(s) 2052. Each set of applications 2064A-R, corresponding virtualization construct (e.g., instance 2062A-R) if implemented, and that part of the hardware 2040 that executes them (be it hardware dedicated to that execution and/or time slices of hardware temporally shared), forms a separate virtual network element(s) 2060A-R.

The virtual network element(s) 2060A-R perform similar functionality to the virtual network element(s) 2030A-R—e.g., similar to the control communication and configuration module(s) 2032A and forwarding table(s) 2034A (this virtualization of the hardware 2040 is sometimes referred to as network function virtualization (NFV)). Thus, NFV may be used to consolidate many network equipment types onto industry standard high-volume server hardware, physical switches, and physical storage, which could be located in Data centers, NDs, and customer premise equipment (CPE). While embodiments of the invention are illustrated with each instance 2062A-R corresponding to one VNE 2060A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 2062A-R to VNEs also apply to embodiments where such a finer level of granularity and/or unikernels are used.

In certain embodiments, the virtualization layer 2054 includes a virtual switch that provides similar forwarding services as a physical Ethernet switch. Specifically, this virtual switch forwards traffic between instances 2062A-R and the physical NI(s) 2046, as well as optionally between the instances 2062A-R; in addition, this virtual switch may enforce network isolation between the VNEs 2060A-R that by policy are not permitted to communicate with each other (e.g., by honoring virtual local area networks (VLANs)).

The third exemplary ND implementation in FIG. 20A is a hybrid network device 2006, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 2002) could provide for para-virtualization to the networking hardware present in the hybrid network device 2006.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 2030A-R, VNEs 2060A-R, and those in the hybrid network device 2006) receives data on the physical NIs (e.g., 2016, 2046) and forwards that data out the appropriate ones of the physical NIs (e.g., 2016, 2046). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

FIG. 20C illustrates various exemplary ways in which VNEs may be coupled according to some embodiments of the invention. FIG. 20C shows VNEs 2070A.1-2070A.P (and optionally VNEs 2070A.Q-2070A.R) implemented in ND 2000A and VNE 2070H.1 in ND 2000H. In FIG. 20C, VNEs 2070A.1-P are separate from each other in the sense that they can receive packets from outside ND 2000A and forward packets outside of ND 2000A; VNE 2070A.1 is coupled with VNE 2070H.1, and thus they communicate packets between their respective NDs; VNE 2070A.2-2070A.3 may optionally forward packets between themselves without forwarding them outside of the ND 2000A; and VNE 2070A.P may optionally be the first in a chain of VNEs that includes VNE 2070A.Q followed by VNE 2070A.R (this is sometimes referred to as dynamic service chaining, where each of the VNEs in the series of VNEs provides a different service—e.g., one or more layer 4-7 network services). While FIG. 20C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 20A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 20A may also host one or more such servers (e.g., in the case of the general purpose network device 2004, one or more of the software instances 2062A-R may operate as servers; the same would be true for the hybrid network device 2006; in the case of the special-purpose network device 2002, one or more such servers could also be run on a virtualization layer executed by the processor(s) 2012); in which case the servers are said to be co-located with the VNEs of that ND.

A virtual network is a logical abstraction of a physical network (such as that in FIG. 20A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 20D illustrates a network with a single network element on each of the NDs of FIG. 20A, and within this straight forward approach contrasts a traditional distributed approach (commonly used by traditional routers) with a centralized approach for maintaining reachability and forwarding information (also called network control), according to some embodiments of the invention. Specifically, FIG. 20D illustrates network elements (NEs) 2070A-H with the same connectivity as the NDs 2000A-H of FIG. 20A.

FIG. 20D illustrates that the distributed approach 2072 distributes responsibility for generating the reachability and forwarding information across the NEs 2070A-H; in other words, the process of neighbor discovery and topology discovery is distributed.

For example, where the special-purpose network device 2002 is used, the control communication and configuration module(s) 2032A-R of the ND control plane 2024 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 2070A-H (e.g., the processor(s) 2012 executing the control communication and configuration module(s) 2032A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 2024. The ND control plane 2024 programs the ND forwarding plane 2026 with information (e.g., adjacency and route information) based on the routing structure(s). For example, the ND control plane 2024 programs the adjacency and route information into one or more forwarding table(s) 2034A-R (e.g., Forwarding Information Base (FIB), Label Forwarding Information Base (LFIB), and one or more adjacency structures) on the ND forwarding plane 2026. For layer 2 forwarding, the ND can store one or more bridging tables that are used to forward data based on the layer 2 information in that data. While the above example uses the special-purpose network device 2002, the same distributed approach 2072 can be implemented on the general-purpose network device 2004 and the hybrid network device 2006.

FIG. 20D illustrates that a centralized approach 2074 (also known as software defined networking (SDN)) that decouples the system that makes decisions about where traffic is sent from the underlying systems that forwards traffic to the selected destination. The illustrated centralized approach 2074 has the responsibility for the generation of reachability and forwarding information in a centralized control plane 2076 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 2076 has a south bound interface 2082 with a data plane 2080 (sometime referred to the infrastructure layer, network forwarding plane, or forwarding plane (which should not be confused with a ND forwarding plane)) that includes the NEs 2070A-H (sometimes referred to as switches, forwarding elements, data plane elements, or nodes). The centralized control plane 2076 includes a network controller 2078, which includes a centralized reachability and forwarding information module 2079 that determines the reachability within the network and distributes the forwarding information to the NEs 2070A-H of the data plane 2080 over the south bound interface 2082 (which may use the OpenFlow protocol). Thus, the network intelligence is centralized in the centralized control plane 2076 executing on electronic devices that are typically separate from the NDs. In one embodiment, centralized reachability and forwarding information module 2079 includes the PCI planner 2055, whose operations are discussed herein relating to the network device 2002. In other words, the network controller 2078 may be the electronic device to perform PCI planning for all or a portion of the network.

For example, where the special-purpose network device 2002 is used in the data plane 2080, each of the control communication and configuration module(s) 2032A-R of the ND control plane 2024 typically include a control agent that provides the VNE side of the south bound interface 2082. In this case, the ND control plane 2024 (the processor(s) 2012 executing the control communication and configuration module(s) 2032A-R) performs its responsibility for participating in controlling how data (e.g., packets) is to be routed (e.g., the next hop for the data and the outgoing physical NI for that data) through the control agent communicating with the centralized control plane 2076 to receive the forwarding information (and in some cases, the reachability information) from the centralized reachability and forwarding information module 2079 (it should be understood that in some embodiments of the invention, the control communication and configuration module(s) 2032A-R, in addition to communicating with the centralized control plane 2076, may also play some role in determining reachability and/or calculating forwarding information—albeit less so than in the case of a distributed approach; such embodiments are generally considered to fall under the centralized approach 2074, but may also be considered a hybrid approach).

While the above example uses the special-purpose network device 2002, the same centralized approach 2074 can be implemented with the general purpose network device 2004 (e.g., each of the VNE 2060A-R performs its responsibility for controlling how data (e.g., packets) is to be routed (e.g., the next hop for the data and the outgoing physical NI for that data) by communicating with the centralized control plane 2076 to receive the forwarding information (and in some cases, the reachability information) from the centralized reachability and forwarding information module 2079; it should be understood that in some embodiments of the invention, the VNEs 2060A-R, in addition to communicating with the centralized control plane 2076, may also play some role in determining reachability and/or calculating forwarding information—albeit less so than in the case of a distributed approach) and the hybrid network device 2006. In fact, the use of SDN techniques can enhance the NFV techniques typically used in the general purpose network device 2004 or hybrid network device 2006 implementations as NFV is able to support SDN by providing an infrastructure upon which the SDN software can be run, and NFV and SDN both aim to make use of commodity server hardware and physical switches.

FIG. 20D also shows that the centralized control plane 2076 has a north bound interface 2084 to an application layer 2086, in which resides application(s) 2088. The centralized control plane 2076 has the ability to form virtual networks 2092 (sometimes referred to as a logical forwarding plane, network services, or overlay networks (with the NEs 2070A-H of the data plane 2080 being the underlay network)) for the application(s) 2088. Thus, the centralized control plane 2076 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 20D shows the distributed approach 2072 separate from the centralized approach 2074, the effort of network control may be distributed differently or the two combined in certain embodiments of the invention. For example: 1) embodiments may generally use the centralized approach (SDN) 2074, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 2074 but may also be considered a hybrid approach.

While FIG. 20D illustrates the simple case where each of the NDs 2000A-H implements a single NE 2070A-H, it should be understood that the network control approaches described with reference to FIG. 20D also work for networks where one or more of the NDs 2000A-H implement multiple VNEs (e.g., VNEs 2030A-R, VNEs 2060A-R, those in the hybrid network device 2006). Alternatively, or in addition, the network controller 2078 may also emulate the implementation of multiple VNEs in a single ND. Specifically, instead of (or in addition to) implementing multiple VNEs in a single ND, the network controller 2078 may present the implementation of a VNE/NE in a single ND as multiple VNEs in the virtual networks 2092 (all in the same one of the virtual network(s) 2092, each in different ones of the virtual network(s) 2092, or some combination). For example, the network controller 2078 may cause an ND to implement a single VNE (a NE) in the underlay network, and then logically divide up the resources of that NE within the centralized control plane 2076 to present different VNEs in the virtual network(s) 2092 (where these different VNEs in the overlay networks are sharing the resources of the single VNE/NE implementation on the ND in the underlay network).

On the other hand, FIGS. 20E and 20F respectively illustrate exemplary abstractions of NEs and VNEs that the network controller 2078 may present as part of different ones of the virtual networks 2092. FIG. 20E illustrates the simple case of where each of the NDs 2000A-H implements a single NE 2070A-H (see FIG. 20D), but the centralized control plane 2076 has abstracted multiple of the NEs in different NDs (the NEs 2070A-C and G-H) into (to represent) a single NE 2070I in one of the virtual network(s) 2092 of FIG. 20D, according to some embodiments of the invention. FIG. 20E shows that in this virtual network, the NE 2070I is coupled to NE 2070D and 2070F, which are both still coupled to NE 2070E.

FIG. 20F illustrates a case where multiple VNEs (VNE 2070A.1 and VNE 2070H.1) are implemented on different NDs (ND 2000A and ND 2000H) and are coupled to each other, and where the centralized control plane 2076 has abstracted these multiple VNEs such that they appear as a single VNE 2070T within one of the virtual networks 2092 of FIG. 20D, according to some embodiments of the invention. Thus, the abstraction of a NE or VNE can span multiple NDs.

While some embodiments of the invention implement the centralized control plane 2076 as a single entity (e.g., a single instance of software running on a single electronic device), alternative embodiments may spread the functionality across multiple entities for redundancy and/or scalability purposes (e.g., multiple instances of software running on different electronic devices).

Figure 21:
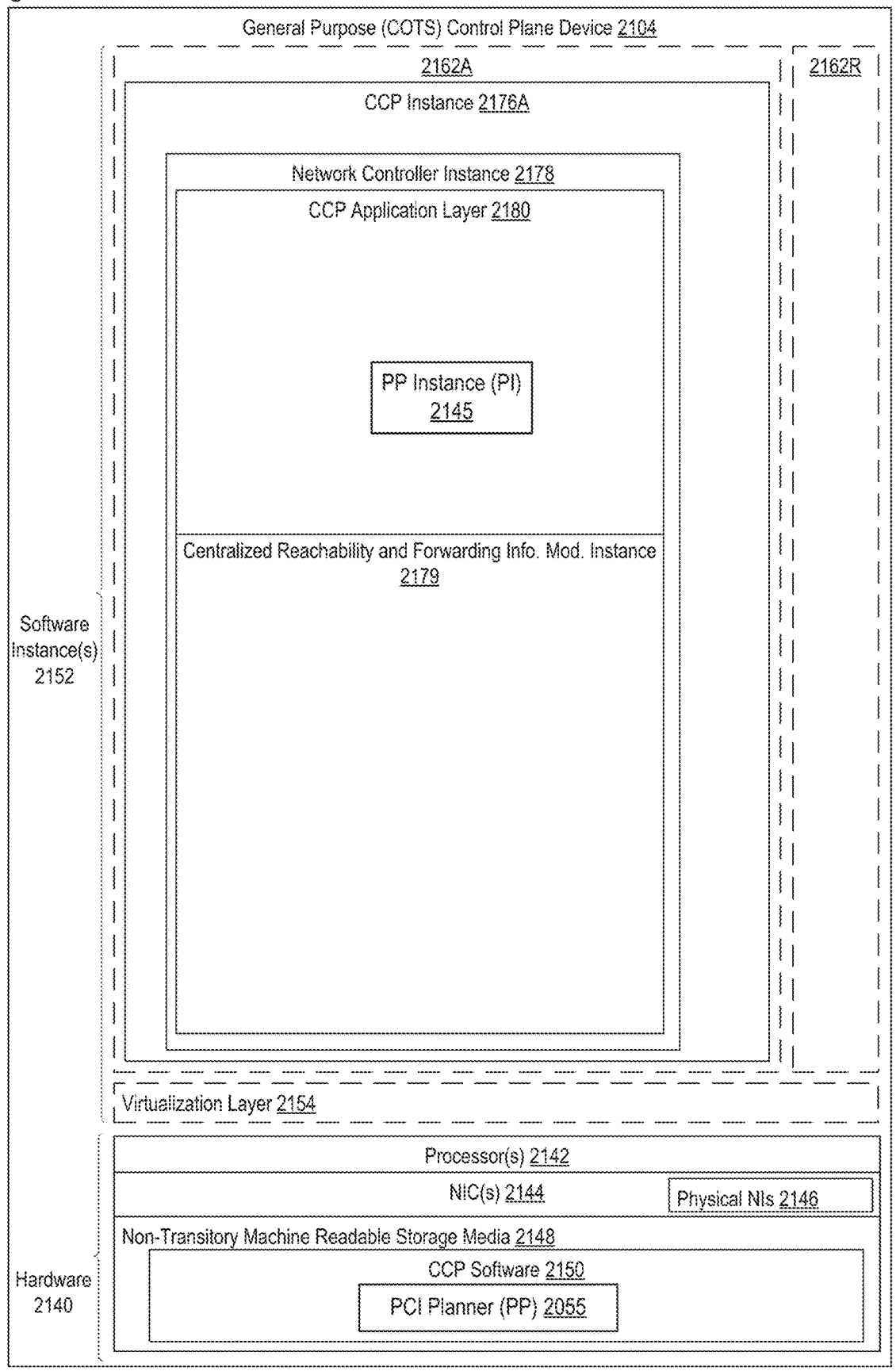
FIG. 21 illustrates a general-purpose control plane device with centralized control plane (CCP) software, according to some embodiments of the invention.

Similar to the network device implementations, the electronic device(s) running the centralized control plane 2076, and thus the network controller 2078 including the centralized reachability and forwarding information module 2079, may be implemented in a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 21 illustrates, a general-purpose control plane device 2104 including hardware 2140 comprising a set of one or more processor(s) 2142 (which are often COTS processors) and physical NIs 2146, as well as non-transitory machine-readable storage media 2148 having stored therein centralized control plane (CCP) software 2150. In one embodiment, the CCP software 2150 include the PCI Planner 2055, whose operations are discussed herein relating to the network device 2002. The In embodiments that use compute virtualization, the processor(s) 2142 typically execute software to instantiate a virtualization layer 2154 (e.g., in one embodiment the virtualization layer 2154 represents the kernel of an operating system (or a shim executing on a base operating system) that allows for the creation of multiple instances 2162A-R called software containers (representing separate user spaces and also called virtualization engines, virtual private servers, or jails) that may each be used to execute a set of one or more applications; in another embodiment the virtualization layer 2154 represents a hypervisor (sometimes referred to as a virtual machine monitor (VMM)) or a hypervisor executing on top of a host operating system, and an application is run on top of a guest operating system within an instance 2162A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 2140, directly on a hypervisor represented by virtualization layer 2154 (in which case the unikernel is sometimes described as running within a LibOS virtual machine), or in a software container represented by one of instances 2162A-R). Again, in embodiments where compute virtualization is used, during operation an instance of the CCP software 2150 (illustrated as CCP instance 2176A) is executed (e.g., within the instance 2162A) on the virtualization layer 2154. In embodiments where compute virtualization is not used, the CCP instance 2176A is executed, as a unikernel or on top of a host operating system, on the "bare metal" general purpose control plane device 2104. The instantiation of the CCP instance 2176A, as well as the virtualization layer 2154 and instances 2162A-R if implemented, are collectively referred to as software instance(s) 2152.

In some embodiments, the CCP instance 2176A includes a network controller instance 2178. The network controller instance 2178 includes a centralized reachability and forwarding information module instance 2179 (which is a middleware layer providing the context of the network controller 2078 to the operating system and communicating with the various NEs), and an CCP application layer 2180 (sometimes referred to as an application layer) over the middleware layer (providing the intelligence required for various network operations such as protocols, network situational awareness, and user-interfaces). At a more abstract level, this CCP application layer 2180 within the centralized control plane 2076 works with virtual network view(s) (logical view(s) of the network) and the middleware layer provides the conversion from the virtual networks to the physical view. In one embodiment, the PCI Planner 2055 may be instantiated as PCI Planner Instance 2145 in the CCP application layer 2180, and other instances in the corresponding CCP application layers of other software containers.

The centralized control plane 2076 transmits relevant messages to the data plane 2080 based on CCP application layer 2180 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 2080 may receive different messages, and thus different forwarding information. The data plane 2080 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 2080, the packet (or a subset of the packet header and content) is typically forwarded to the centralized control plane 2076. The centralized control plane 2076 will then program forwarding table entries into the data plane 2080 to accommodate packets belonging to the flow of the unknown packet. Once a specific forwarding table entry has been programmed into the data plane 2080 by the centralized control plane 2076, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Each VNE (e.g., a virtual router, a virtual bridge (which may act as a virtual switch instance in a Virtual Private LAN Service (VPLS)) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Alternative Embodiments

While embodiments of the invention have been described in relation to FIGS. 8 to 21, embodiments of the invention are not limited to the ones described relating to FIGS. 8-21 and alternative embodiments could be implemented.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for physical layer sub-cell identity allocation to select a sub-cell identity vector for a network device in a wireless network, the method comprising:
   selecting a plurality of sub-cell identity vector candidates for the network device from a set of possible sub-cell identity vector candidates, wherein the network device has a plurality of sectors, each of which is to be allocated to one sub-cell identity within the sub-cell identity vector, and wherein the selecting removes one or more possible sub-cell identity vector candidates containing a same sub-cell identity for two or more adjacent sectors of the network device;
   determining a plurality of conflict measurements for each of the plurality of sub-cell identity vector candidates, each conflict measurement for a metric measuring sub-cell identity confliction of the plurality of sectors with one or more neighbor cells of the network device in the wireless network, each of the one or more neighbor cells belonging to another network device;
   deriving a single value from the plurality of conflict measurements for each of the plurality of sub-cell identity vector candidates; and
   selecting the sub-cell identity vector for the network device from the plurality of sub-cell identity vector candidates based on the single value,
   wherein the sub-cell identity defines an alignment of a reference signal within a slot.

2. The method of claim 1, further comprising:
   determining the set of possible sub-cell identity vector candidates based on the plurality of sectors.

3. The method of claim 1, wherein the plurality of conflict measurements includes one or more of the following metrics:
   a number of conflicts of the plurality of sectors with the one or more neighbor cells;
   a distance measurement of the number of conflicts; and
   a relative orientation measurement of the number of conflicts.

4. The method of claim 1, wherein the plurality of conflict measurements includes one or more of the following metrics:
   a face factor measurement for face factor between the plurality of sectors and the one or more neighbor cells, wherein a face factor measures a relative orientation between a sector and a neighbor cell;
   a size measurement of one or more overlap regions between the plurality of sectors and the one or more neighbor cells;
   a route length measurement for rout length in the one or more overlap regions between the plurality of sectors and the one or more neighbor cells; and
   a size measurement for building areas in the one or more overlap regions between the plurality of sectors and the one or more neighbor cells.

5. The method of claim 1, wherein deriving the single value from the plurality of conflict measurements for each of the plurality of sub-cell identity vector candidates comprises:
   normalizing each of the plurality of conflict measurements to be within a same range of values; and
   combining the plurality of conflict measurements into the single value after the normalizing.

6. The method of claim 5, wherein the combination of the plurality of conflict measurements uses different weights for at least a subset of the plurality of conflict measurements.

7. The method of claim 5, wherein the sub-cell identity vector is mapped to a minimum value or a maximum value among the derived single values, each for one of the plurality of sub-cell identity vector candidates.

8. The method of claim 1, wherein each sub-cell identity is an integer, which has a value of zero, one, or two.

9. An electronic device for physical layer sub-cell identity allocation to select a sub-cell identity vector for a network device in a wireless network, comprising:
   a processor and non-transitory computer-readable storage medium that provides instructions that, when executed by the processor, cause the electronic device to perform:
      select a plurality of sub-cell identity vector candidates for the network device from a set of possible sub-cell identity vector candidates, wherein the network device has a plurality of sectors, each of which is to be allocated to one sub-cell identity within the sub-cell identity vector, and wherein the select removes one or more possible sub-cell identity vector candidates containing a same sub-cell identity for two or more adjacent sectors of the network device;
      determine a plurality of conflict measurements for each of the plurality of sub-cell identity vector candidates, each conflict measurement for a metric measuring sub-cell identity confliction of the plurality of sectors with one or more neighbor cells of the network device in the wireless network, each of the one or more neighbor cells belonging to another network device;
      derive a single value from the plurality of conflict measurements for each of the plurality of sub-cell identity vector candidates; and
      select the sub-cell identity vector for the network device from the plurality of sub-cell identity vector candidates based on the single value,
      wherein the sub-cell identity defines an alignment of a reference signal within a slot.

10. The electronic device of claim 9, further to perform:
    determine the set of possible sub-cell identity vector candidates based on the plurality of sectors.

11. The electronic device of claim 9, wherein the plurality of conflict measurements includes one or more of the following:
    a number of conflicts of the plurality of sectors with the one or more neighbor cells;
    a distance measurement of the number of conflicts; and
    a relative orientation measurement of the number of conflicts.

12. The electronic device of claim 9, wherein the plurality of conflict measurements includes one or more of the following metrics:

a face factor measurement for face factor between the plurality of sectors and the one or more neighbor cells, wherein a face factor measures a relative orientation between a sector and a neighbor cell;

a size measurement of one or more overlap regions between the plurality of sectors and the one or more neighbor cells;

a route length measurement for rout length in the one or more overlap regions between the plurality of sectors and the one or more neighbor cells; and a size measurement for building areas in the one or more overlap regions between the plurality of sectors and the one or more neighbor cells.

13. The electronic device of claim 9, wherein derive the single value from the plurality of conflict measurements for each of the plurality of sub-cell identity vector candidates comprises:

normalize each of the plurality of conflict measurements to be within a same range of values; and combine the plurality of conflict measurements into the single value after the normalizing.

14. The electronic device of claim 13, wherein the combination of the plurality of conflict measurements uses different weights for at least a subset of the plurality of conflict measurements.

15. The electronic device of claim 13, wherein the sub-cell identity vector is mapped to a minimum value or a maximum value among the derived single values, each for one of the plurality of sub-cell identity vector candidates.

16. The electronic device of claim 9, wherein each sub-cell identity is an integer, which has a value of zero, one, or two.

17. A non-transitory computer-readable storage medium that provides instructions that, when executed by a processor, cause an electronic device to perform:

select a plurality of sub-cell identity vector candidates for a network device in a wireless network from a set of possible sub-cell identity vector candidates, wherein the network device has a plurality of sectors, each of which is to be allocated to one sub-cell identity within a sub-cell identity vector, and wherein the select removes one or more possible sub-cell identity vector candidates containing a same sub-cell identity for two or more adjacent sectors of the network device;

determine a plurality of conflict measurements for each of the plurality of sub-cell identity vector candidates, each conflict measurement for a metric measuring sub-cell identity confliction of the plurality of sectors with one or more neighbor cells of the network device in the wireless network, each of the one or more neighbor cells belonging to another network device;

derive a single value from the plurality of conflict measurements for each of the plurality of sub-cell identity vector candidates; and select a sub-cell identity vector for the network device from the plurality of sub-cell identity vector candidates based on the single value, wherein the sub-cell identity defines an alignment of a reference signal within a slot.

18. The non-transitory computer-readable storage medium of claim 17, wherein the plurality of conflict measurements includes one or more of the following metrics:

a number of conflicts of the plurality of sectors with the one or more neighbor cells;

a distance measurement of the number of conflicts; and a relative orientation measurement of the number of conflicts.

19. The non-transitory computer-readable storage medium of claim 17, wherein the plurality of conflict measurements includes one or more of the following metrics:

a face factor measurement for face factor between the plurality of sectors and the one or more neighbor cells, wherein a face factor measures a relative orientation between a sector and a neighbor cell;

a size measurement of one or more overlap regions between the plurality of sectors and the one or more neighbor cells;

a route length measurement for rout length in the one or more overlap regions between the plurality of sectors and the one or more neighbor cells; and a size measurement for building areas in the one or more overlap regions between the plurality of sectors and the one or more neighbor cells.

20. The non-transitory computer-readable storage medium of claim 17, wherein derive the single value from the plurality of conflict measurements for each of the plurality of sub-cell identity vector candidates comprises:

normalize each of the plurality of conflict measurements to be within a same range of values; and combine the plurality of conflict measurements into the single value after the normalizing.

* * * * *